US009190925B2

(12) United States Patent
Yamamoto et al.

(10) Patent No.: US 9,190,925 B2
(45) Date of Patent: *Nov. 17, 2015

(54) AC CONVERTER FOR CONVERTING A SINGLE-PHASE INPUT AC VOLTAGE INTO A THREE-PHASE OUTPUT AC VOLTAGE

(71) Applicant: Panasonic Corporation, Osaka (JP)

(72) Inventors: Hiroshi Yamamoto, Osaka (JP); Junichi Itoh, Niigata (JP)

(73) Assignee: Panasonic Corporation, Osaka (JP)

( * ) Notice: Subject to any disclaimer, the term of this patent is extended or adjusted under 35 U.S.C. 154(b) by 42 days.

This patent is subject to a terminal disclaimer.

(21) Appl. No.: 14/008,709

(22) PCT Filed: Nov. 15, 2012

(86) PCT No.: PCT/JP2012/007333
§ 371 (c)(1),
(2) Date: Sep. 30, 2013

(87) PCT Pub. No.: WO2013/076937
PCT Pub. Date: May 30, 2013

(65) Prior Publication Data
US 2014/0056038 A1    Feb. 27, 2014

(30) Foreign Application Priority Data

Nov. 22, 2011    (JP) ................................. 2011-254791

(51) Int. Cl.
*H02M 5/458*    (2006.01)
*H02M 5/297*    (2006.01)
*H02M 7/48*    (2007.01)

(52) U.S. Cl.
CPC .............. *H02M 5/458* (2013.01); *H02M 5/297* (2013.01); *H02M 7/4826* (2013.01)

(58) Field of Classification Search
CPC ..... H02M 5/4585; H02M 5/458; H02M 1/12; H02M 7/5395; H02M 1/32; H02M 7/5387; H02M 7/53871; H02H 11/002

USPC ........... 363/17, 37, 34, 36, 40, 41, 55, 56.01, 363/56.02, 97, 98, 126, 132
See application file for complete search history.

(56) References Cited

U.S. PATENT DOCUMENTS 5,182,701 A    1/1993   Mochikawa et al.
5,926,381 A *  7/1999   Moriguchi et al. ............. 363/17
(Continued)

FOREIGN PATENT DOCUMENTS

JP    04-079770 A    3/1992
JP    11-346478 A    12/1999
(Continued)

OTHER PUBLICATIONS

Nakata et al., "An Experimental Verification of a Single-phase-to-three-phase Matrix Converter Using PDM Control for High Frequency Applications", The Papers of Technical Meeting, IEE Japan, vol. SPC-11, No. 1-17, 19-24, Jan. 21, 2011, pp. 109-114.*

(Continued)

*Primary Examiner* — Jue Zhang
*Assistant Examiner* — Alex Torres-Rivera
(74) *Attorney, Agent, or Firm* — Renner, Otto, Boisselle & Sklar, LLP

(57) ABSTRACT

The AC converter converts a single-phase input AC voltage with a frequency f0 into a three-phase output AC voltage with a frequency f1 that is lower than f0. The AC converter includes a switching section with multiple switching elements and a switching control section that controls the conduction states of the respective switching elements. The switching control section supplies pulses that have been subjected to a pulse density modulation based on space vector modulation to the switching section, thereby getting the conversion into a three-phase output AC voltage done.

11 Claims, 28 Drawing Sheets

(56) References Cited

U.S. PATENT DOCUMENTS

| | | | |
|---|---|---|---|
| 6,313,602 B1* | 11/2001 | Arefeen et al. | 363/45 |
| 6,320,775 B1* | 11/2001 | Ito et al. | 363/132 |
| 6,653,812 B1* | 11/2003 | Huo et al. | 318/801 |
| 6,850,424 B2* | 2/2005 | Baudelot et al. | 363/37 |
| 8,681,517 B2* | 3/2014 | Itoh et al. | 363/37 |
| 2007/0222542 A1 | 9/2007 | Joannopoulos et al. | |
| 2008/0278264 A1 | 11/2008 | Karalis et al. | |
| 2009/0067203 A1* | 3/2009 | Chakrabarti et al. | 363/97 |
| 2009/0251086 A1* | 10/2009 | Sekimoto et al. | 318/400.23 |
| 2011/0019452 A1* | 1/2011 | Shinomoto et al. | 363/126 |
| 2011/0026285 A1* | 2/2011 | Kawashima et al. | 363/127 |
| 2012/0268039 A1* | 10/2012 | Chen | 315/308 |

FOREIGN PATENT DOCUMENTS

| | | |
|---|---|---|
| JP | 2000-324853 A | 11/2000 |
| JP | 2008-048530 A | 2/2008 |
| JP | 2009-501510 T | 1/2009 |

OTHER PUBLICATIONS

International Search Report for corresponding International Application No. PCT/JP2012/007333 mailed Feb. 12, 2013.

* cited by examiner

FIG.2
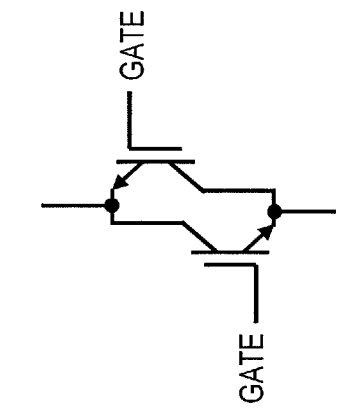
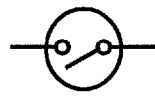
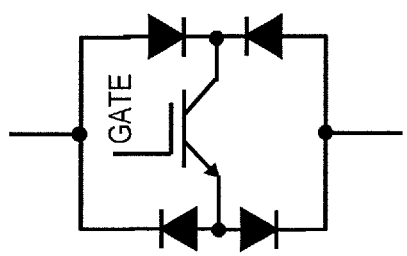
DIODE BRIDGE TYPE
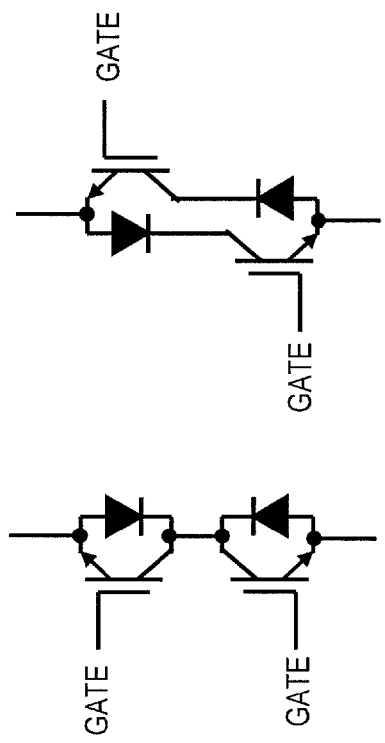
(b)
(a)
PARALLEL TYPE
SERIES TYPE

| INPUT VOLTAGE POLARITY | + | | | | | | − | | | | | |
|---|---|---|---|---|---|---|---|---|---|---|---|---|
| PHASES TO OUTPUT TO | UV | | VW | | WU | | UV | | VW | | WU | |
| OUTPUT VOLTAGE POLARITY | + | − | + | − | + | − | + | − | + | − | + | − |
| U | ON | | | | | ON | ON | | | | ON | |
| V | | ON | ON | | | | | ON | | ON | | |
| W | | | | ON | ON | | | | ON | | | ON |
| X | | ON | | ON | ON | | | | | | | ON |
| Y | ON | | | ON | | | | ON | ON | | | |
| Z | | | ON | | | ON | | | | | ON | ON |

| PHASES TO OUTPUT TO | OUTPUT VOLTAGE POLARITY | U | V | W | X | Y | Z |
|---|---|---|---|---|---|---|---|
| uv | + | ON | | | | ON | |
| uv | - | | ON | | ON | | |
| vw | + | | ON | | | | ON |
| vw | - | | | ON | ON | | |
| wu | + | | | ON | | ON | |
| wu | - | ON | | | | | ON |

CONVENTIONAL ART

AC CONVERTER FOR CONVERTING A SINGLE-PHASE INPUT AC VOLTAGE INTO A THREE-PHASE OUTPUT AC VOLTAGE

TECHNICAL FIELD

The present application relates to a technique for converting an AC voltage with a relatively high frequency into an AC voltage with a relatively low frequency.

BACKGROUND ART

Recently, various power transmission methods that use resonant magnetic coupling have been proposed to provide a system that transmits power by a non-contact method. Patent Document No. 1 discloses a new type of wireless energy transfer system for transferring energy from one of two resonators to the other, and vice versa, through the space between them by utilizing an electromagnetic coupling phenomenon that produces between those two resonators. That wireless energy transfer system couples the two resonators with each other via the evanescent tail of the oscillation energy of the resonant frequency that is produced in the space surrounding those two resonators, thereby transferring the oscillation energy wirelessly (i.e., by a non-contact method).

In that wireless power transmission system, the output power of the resonators is AC power that has as high a frequency as the resonant frequency, which is usually set to be 100 kHz or more. If that high frequency AC power needs to be supplied to general household users, the AC power should be converted into an AC power with as low a frequency as 50/60 Hz for use in a utility power grid. Also, if that high frequency AC power is used to control the rotation of a motor directly, the AC power should be converted into an AC power with a required output frequency.

On the other hand, an inverter technology may be used to convert an AC power with a predetermined frequency into an AC power with an arbitrary frequency. Patent Document discloses a normal inverter technology. According to the converting method of Patent Document No. 2, an incoming AC power is once converted into a DC power, and then current flowing directions are changed with respect to a load by using multiple switching elements, thereby obtaining an AC power. In that case, the output frequency is determined by the frequency at which those switching elements are turned ON and OFF.

CITATION LIST

Patent Literature

Patent Document No. 1: United States Patent Application Publication No. 2008/0278264
Patent Document No. 2: Japanese Laid-Open Patent Publication No. 11-346478
Patent Document No. 3: Japanese Laid-Open Patent Publication No. 4-79770
Patent Document No. 4: U.S. Pat. No. 6,313,602

SUMMARY OF INVENTION

Technical Problem

In the conventional AC converter, however, the high-frequency AC power is once converted into a DC power, thus inevitably causing some power loss. In addition, since the switches are turned ON and OFF with a DC voltage applied, switching loss is also caused inevitably. On top of that, since a capacitor is needed for rectifying purposes, the cost and durability problems should arise.

The present disclosure provides an AC converter that can minimize such a decrease in conversion efficiency when an AC power with a relatively high frequency, which has been supplied from a wireless power transmission system, for example, is converted into an AC power with a relatively low frequency.

Solution to Problem

To overcome this problem, an AC converter according to an embodiment of the present disclosure converts a single-phase input AC voltage with a frequency f0 into a three-phase output AC voltage with a frequency f1 that is lower than f0. The converter includes: a switching section that converts the input AC voltage in response to a control signal and that outputs the converted voltage to a phase that has been selected in accordance with the control signal; a filter section that filters out high frequency components from the converted voltage, thereby converting the converted voltage into the output AC voltage; and a switching control section that performs a pulse density modulation on a phase-by-phase basis and based on a reference signal with the frequency f1 which is associated with the output AC voltage of each phase, synchronously with a zero cross of the input AC voltage, thereby generating the control signal according to a pulse generation status by the pulse density modulation and the polarity of the input AC voltage and sending out the control signal to the switching section. The switching section includes a first type of switching element that applies a positive voltage to its associated phase if the polarity of the input AC voltage is positive and a second type of switching element that applies a positive voltage to its associated phase if the polarity of the input AC voltage is negative. If the polarities of the input AC voltage and the reference signal for use in the pulse density modulation are both positive, the switching control section outputs the control signal to control the switching section to turn the first type of switching element ON. If the polarities of the input AC voltage and the reference signal for use in the pulse density modulation are negative and positive, respectively, the switching control section outputs the control signal to control the switching section to turn the second type of switching element ON. If the polarities of the input AC voltage and the reference signal for use in the pulse density modulation are positive and negative, respectively, the switching control section outputs the control signal to control the switching section to turn the second type of switching element ON. And if the polarities of the input AC voltage and the reference signal for use in the pulse density modulation are both negative, the switching control section outputs the control signal to control the switching section to turn the first type of switching element ON. The switching control section outputs the control signal to control the switching section so as to avoid turning ON both of the first and second types of switching elements that are associated with the same phase at the same time. And the switching control section performs the pulse density modulation based on a space vector modulation.

An AC converter according to another embodiment of the present disclosure converts a single-phase input AC voltage with a frequency f0 into a three-phase output AC voltage with a frequency f1 that is lower than f0. The converter includes: a converter section that converts the input AC voltage into a DC voltage; a switching section that converts the DC voltage in response to a control signal and that outputs the converted voltage to a phase that has been selected in accordance with the control signal; a filter section that filters out high frequency components from the converted voltage, thereby converting the converted voltage into the output AC voltage; and a switching control section that performs a pulse density modulation on a phase-by-phase basis and based on a reference signal with the frequency f1 which is associated with the output AC voltage of each phase, synchronously with a zero cross of the input AC voltage, thereby generating the control signal according to a pulse generation status by the pulse density modulation and sending out the control signal to the switching section. The switching section includes a first type of switching element that applies a positive voltage to its associated phase if the polarity of the input AC voltage is positive and a second type of switching element that applies a positive voltage to its associated phase if the polarity of the input AC voltage is negative. If the polarity of the reference signal for use in the pulse density modulation is positive, the switching control section outputs the control signal to control the switching section to turn the first type of switching element ON. And if the polarity of the reference signal for use in the pulse density modulation is negative, the switching control section outputs the control signal to control the switching section to turn the second type of switching element ON. The switching control section outputs the control signal to control the switching section so as to avoid turning ON both of the first and second types of switching elements that are associated with the same phase at the same time. The switching control section performs the pulse density modulation based on a space vector modulation.

This general and particular aspect can be implemented as a system, a method, a computer program or a combination thereof.

Advantageous Effects of Invention

According to an embodiment of the present disclosure, a switching operation is performed when the input high-frequency AC voltage has an input voltage of zero, and therefore, power conversion can get done more efficiently than previously.

BRIEF DESCRIPTION OF DRAWINGS

FIG. 2 Illustrates exemplary configurations for a switching element according to the first embodiment.

FIG. 9 A table showing how the switches to turn ON change according to the input and output characteristics according to the first embodiment.

FIG. 13 A table showing how the switches to turn ON change according to the input and output characteristics according to the second embodiment.

DESCRIPTION OF EMBODIMENTS

Figure 1A:
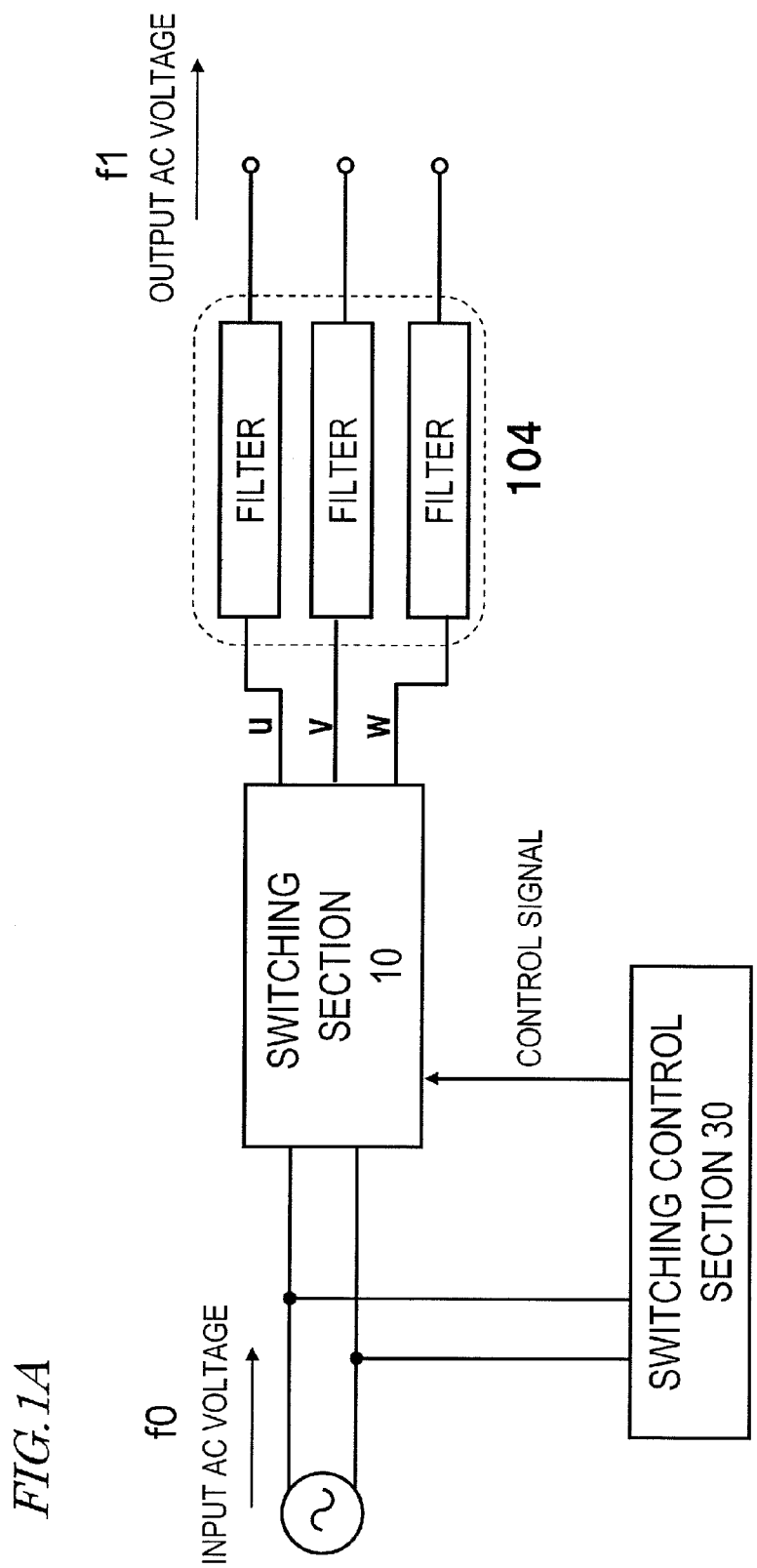
FIG. 1A Illustrates an exemplary general configuration for an AC converter as an exemplary embodiment.

Exemplary embodiments of the present disclosure are outlined as follows:

An AC converter according to an aspect of the present disclosure converts a single-phase input AC voltage with a frequency f0 into a three-phase output AC voltage with a frequency f1 that is lower than f0. The converter includes: a switching section which converts the input AC voltage in response to a control signal and which outputs the converted voltage to a phase that has been selected in accordance with the control signal; a filter section which filters out high frequency components from the converted voltage, thereby converting the converted voltage into the output AC voltage; and a switching control section that performs a pulse density modulation on a phase-by-phase basis and based on a reference signal with the frequency f1 which is associated with the output AC voltage of each phase, synchronously with a zero cross of the input AC voltage, thereby generating the control signal according to a pulse generation status by the pulse density modulation and the polarity of the input AC voltage and sending out the control signal to the switching section. The switching section includes a first type of switching element that applies a positive voltage to its associated phase if the polarity of the input AC voltage is positive and a second type of switching element that applies a positive voltage to its associated phase if the polarity of the input AC voltage is negative. If the polarities of the input AC voltage and the reference signal for use in the pulse density modulation are both positive, the switching control section outputs the control signal to control the switching section to turn the first type of switching element ON. If the polarities of the input AC voltage and the reference signal for use in the pulse density modulation are negative and positive, respectively, the switching control section outputs the control signal to control the switching section to turn the second type of switching element ON. If the polarities of the input AC voltage and the reference signal for use in the pulse density modulation are positive and negative, respectively, the switching control section outputs the control signal to control the switching section to turn the second type of switching element ON. And if the polarities of the input AC voltage and the reference signal for use in the pulse density modulation are both negative, the switching control section outputs the control signal to control the switching section to turn the first type of switching element ON. The switching control section outputs the control signal to control the switching section so as to avoid turning ON both of the first and second types of switching elements that are associated with the same phase at the same time. And the switching control section performs the pulse density modulation based on a space vector modulation.

An AC converter according to another aspect of the present disclosure converts a single-phase input AC voltage with a frequency f0 into a three-phase output AC voltage with a frequency f1 that is lower than f0. The converter includes: a converter section which converts the input AC voltage into a DC voltage; a switching section which converts the DC voltage in response to a control signal and which outputs the converted voltage to a phase that has been selected in accordance with the control signal; a filter section which filters out high frequency components from the converted voltage, thereby converting the converted voltage into the output AC voltage; and a switching control section that performs a pulse density modulation on a phase-by-phase basis and based on a reference signal with the frequency f1, which is associated with the output AC voltage of each phase, synchronously with a zero cross of the input AC voltage, thereby generating the control signal according to a pulse generation status by the pulse density modulation and sending out the control signal to the switching section. The switching section includes a first type of switching element that applies a positive voltage to its associated phase if the polarity of the input AC voltage is positive and a second type of switching element that applies a positive voltage to its associated phase if the polarity of the input AC voltage is negative. If the polarity of the reference signal for use in the pulse density modulation is positive, the switching control section outputs the control signal to control the switching section to turn the first type of switching element ON. And if the polarity of the reference signal for use in the pulse density modulation is negative, the switching control section outputs the control signal to control the switching section to turn the second type of switching element ON. The switching control section outputs the control signal to control the switching section so as to avoid turning ON both of the first and second types of switching elements that are associated with the same phase at the same time. The switching control section performs the pulse density modulation based on a space vector modulation.

In one embodiment, the AC converter includes a snubber circuit which is provided between the converter section and the switching section to reduce unwanted oscillation at the time of switching.

In one embodiment, the snubber circuit includes a diode, a capacitor and a resistor.

In one embodiment, the switching control section includes: a reference signal generating section which generates three different reference signals with the frequency f1 that are associated with the output AC voltages of respective phases synchronously with the zero cross of the input AC voltage; a carrier signal generating section which generates a carrier signal having a higher frequency than the frequency of the reference signals; and a space vector modulating section which performs a space vector modulation based on the three different reference signals that have been generated by the reference signal generating section and the carrier signal that has been generated by the carrier signal generating section. The space vector modulating section determines conduction states of the respective switching elements in the switching section by reference to the three different reference signals and determines the duration of the conduction state of each switching element by reference to the carrier signal.

In one embodiment, the space vector modulating section transforms the three different reference signals into pulses by space vector modulation and outputs the pulses to the switching elements associated with the respective phases synchronously with the zero cross of the input AC voltage.

In one embodiment, the switching control section includes: a positive/negative determining section which determines the polarity of the input AC voltage; and a switching signal output section which generates the control signal based on the pulses supplied from the space vector modulating section and a decision made by the positive/negative determining section and which sends out the control signal to the switching section.

In one embodiment, the switching control section changes the ON and OFF states of the respective switching elements at a time interval that is equal to or longer than a minimum ON period and a minimum OFF period that have been set in advance, and the minimum ON period and the minimum OFF period are set to be $n1/2f0$ (where n1 is an integer that is equal to or greater than two).

In one embodiment, the switching control section changes the ON and OFF states of the respective switching elements at a time interval that is equal to or shorter than a maximum ON period and a maximum OFF period that have been set in advance, and the maximum ON period and the maximum OFF period are set to be $n2/2f0$ (where n2 is an integer that is equal to or greater than two).

In one embodiment, the switching control section controls the switching section so that a portion of the input AC voltage that covers a half period is always output only to one particular phase.

In one embodiment, the AC converter further includes a zero cross timing detecting section which detects a timing when the input AC voltage goes zero and notifies the switching control section of that timing.

Hereinafter, the problems with the prior art that were found out by the present inventors and the general technique of the present disclosure will be described before specific embodiments of the present disclosure are described.

Figure 20:
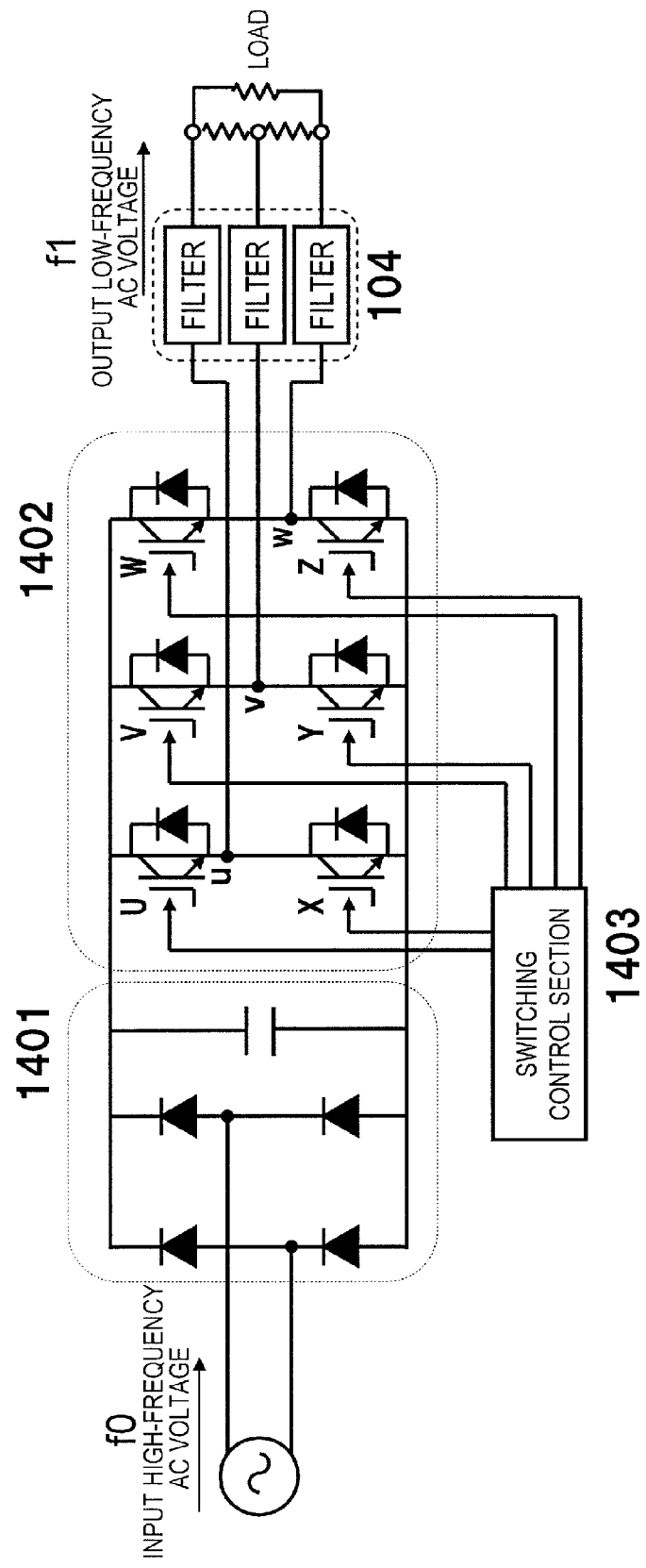
FIG. 20 Illustrates a configuration for a conventional AC converter.

FIG. 20 illustrates a configuration for an AC converter on the power receiving end for converting a high-frequency single-phase AC power for use in a wireless power transmission system, for example, into a three-phase AC power with a lower frequency by the conventional inverter technology. This AC converter includes a rectifying section 1401 for converting an incoming high-frequency AC power into a DC power, an inverter section 1402 for supplying the output voltage of the rectifying section 1401 to respective phases using multiple switching elements, and a low-pass filter section 104 including multiple low-pass filters that are provided for the respective phases (and which will be simply referred to herein as "filters"). The AC converter further includes a switching control section 1403 for controlling the operations of those switching elements that are included in the inverter section 1402.

Hereinafter, it will be described how the AC converter shown in FIG. 20 operates. First of all, the incoming high-frequency AC power is converted by the rectifying section 1401 into a DC power. Next, the inverter section 1402 turns those switching elements U, V, W, X, Y and Z ON and OFF so that the current flowing through the load in each phase has its directions changed alternately. In this case, semiconductor switches such as MOSFETs or IGBTs are generally used as the switching elements U, V, W, X, Y and Z. The timings to turn those switching elements ON and OFF are controlled by pulse width modulation (PWM) method.

Figure 21A:
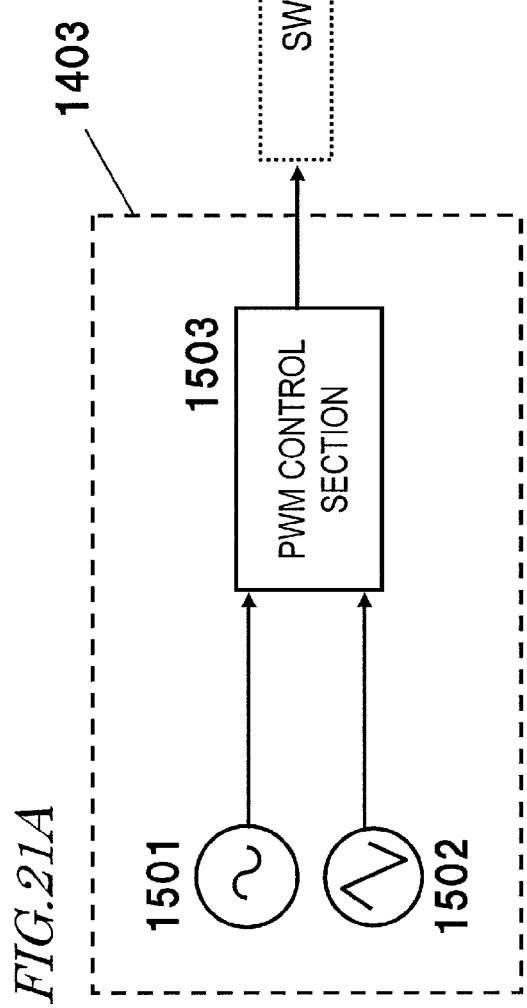
FIG. 21A Illustrates a configuration for a switching control section for a conventional AC converter.
Figure 21B:
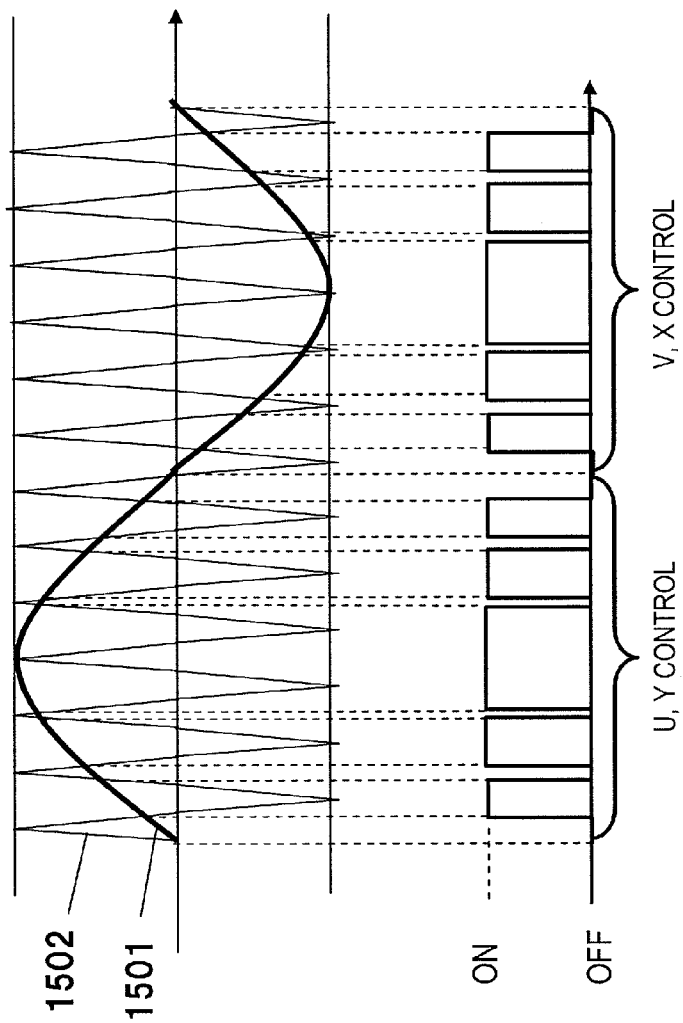
FIG. 21B Shows the timings of switching to be made by the switching control section of the conventional AC converter.

FIGS. 21A and 21B illustrate the configuration and operation of the switching control section 1403. As shown in FIG. 21A, the switching control section 1403 includes a PWM control section 1503 that receives a reference sinusoidal wave 1501, of which the frequency is set to be as high as that of the low-frequency power to output, and a triangular wave 1502, of which the frequency has been predefined to be higher than that frequency. The PWM control section 1503 supplies pulses, which have been generated based on the reference sinusoidal wave 1501 and the triangular wave 1502, to the respective gates of predetermined switching elements.

As an example, it will be described how the switching control section 1403 operates when outputting power to between u and v phases. FIG. 21B shows exemplary switching timings for the PWM control section 1503. First of all, the PWM control section 1503 compares the respective input values of the reference sinusoidal wave 1501 and the triangular wave 1502 to each other. If "reference sinusoidal wave≥0" and "reference sinusoidal wave≥triangular wave", the PWM control section 1503 turns switching elements U and Y ON. On the other hand, if "reference sinusoidal wave≥0" and "reference sinusoidal wave<triangular wave", the PWM control section 1503 turns switching elements U and Y OFF. Meanwhile, if "reference sinusoidal wave<0" and "reference sinusoidal wave≥triangular wave", the PWM control section 1503 turns switching elements V and X OFF. On the other hand, if "reference sinusoidal wave<0" and "reference sinusoidal wave<triangular wave", the PWM control section 1503 turns switching elements V and X ON. By performing these operations, the PWM control section 1503 outputs pulses, of which the widths vary according to the amplitude of the reference sinusoidal wave.

The DC power that has been supplied to the inverter section 1402 is converted as a result of these switching operations into a train of pulses, of which the widths are the same as those of the pulses shown in FIG. 21B. And such a train of pulses is output. By passing through the low-pass filter section 104, the output pulse train is converted into a sinusoidal wave with the intended frequency as final output. In the example described above, a configuration for obtaining a sinusoidal wave output has been described. However, even if the given reference sinusoidal wave is converted to have an arbitrary frequency and an arbitrary waveform, the incoming high-frequency AC power can also be converted into AC power with the arbitrary frequency and the arbitrary waveform.

In the AC converter with such a configuration, however, the high-frequency AC power is once converted into a DC power by the rectifying section 1401, thus inevitably causing some power loss. In addition, since the inverter section 1402 turns the switches ON and OFF with the DC voltage applied, switching loss is also caused inevitably. On top of that, since a capacitor is needed for rectifying purposes, the increased cost and decreased durability problems should arise.

The present inventors newly found these problems with the related art and perfected an AC converter that can minimize such a decrease in conversion efficiency when an AC power with a relatively high frequency which has been supplied from a wireless power transmission system, for example, is converted into an AC power with a relatively low frequency. Hereinafter, embodiments of the present disclosure will be outlined.

FIG. 1A illustrates an exemplary configuration for an AC converter according to an embodiment of the present disclosure. The AC converter shown in FIG. 1A is configured to convert a single-phase AC voltage with a frequency f0 (which will be sometimes referred to herein as an "input AC voltage") into a three-phase AC voltage with a frequency f1 that is lower than f0 (which will be sometimes referred to herein as an "output AC voltage"). This AC converter includes a switching section 10 which converts the input AC voltage in response to a control signal and which outputs the converted voltage to respective phases (i.e., to between u and v phases, to between v and w phases, and to between w and u phases), and a filter section 104 which filters out high frequency components from the output of the switching section 10, thereby outputting the output AC voltage. The AC converter further includes a switching control section 30 that generates the control signal and that supplies the signal to the switching section 10, thereby controlling the switching section 10.

The switching control section 30 performs a pulse density modulation on a phase-by-phase basis and based on a reference signal with the frequency f1 which is associated with the output AC voltage of each phase, synchronously with a zero cross of the input AC voltage. In this manner, the switching control section 30 generates the control signal according to a pulse generation status by the pulse density modulation and the polarity of the input AC voltage and sends out the control signal to the switching section 10. And it is determined by this control signal to which phase the converted voltage needs to be output. This series of operations is performed every time the input AC voltage goes zero (i.e., every half period of the input AC voltage). In this description, "the pulse generation status" refers to whether or not a pulse has been generated in the first place with respect to each phase and also refers to the polarity of the pulse generated if the answer is YES.

The switching section 10 typically includes a number of switching elements and turns ON and OFF a particular switching element that has been selected in accordance with a control signal, thereby distributing the input voltage to three phases. In this case, the "ON" state refers herein to an electrically conduction state and the "OFF" state refers herein to an electrically non-conduction state. In this manner, the intended three-phase AC voltage can be generated dynamically according to the respective polarities of the input and output AC voltages. It should be noted that even if "the input AC voltage goes zero", the input AC voltage may naturally be exactly equal to zero but may also be substantially equal to zero. In this description, if the difference of the input AC voltage from zero accounts for less than 10% of the amplitude of the input AC voltage, then the input AC voltage is supposed to be substantially equal to zero.

Figure 1B:
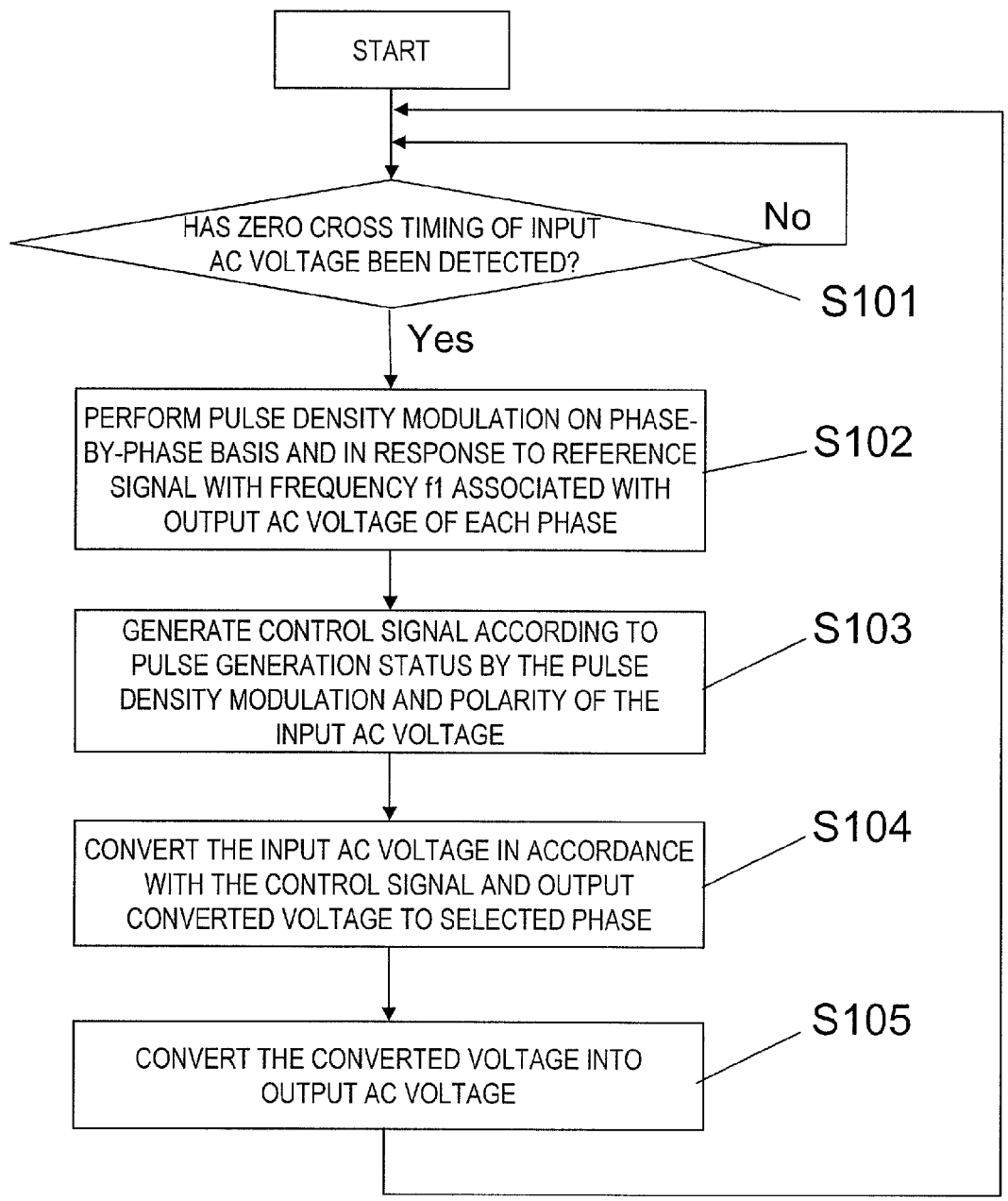
FIG. 1B A flowchart showing an exemplary procedure in which the AC converter according to the exemplary embodiment operates.

FIG. 1B is a flowchart showing the procedure of the operation of the AC converter shown in FIG. 1A. First of all, in Step S101, it is determined whether or not a zero cross timing of the input AC voltage has been detected. This processing step S101 is performed by a detector (not shown), for example. If the answer is YES, the process advances to Step S102, in which a pulse density modulation is performed on a phase-by-phase basis and in response to a reference signal with the frequency f1, which is associated with the output AC voltage of each phase. Next, in Step S103, a control signal is generated according to a pulse generation status by the pulse density modulation and the polarity of the input AC voltage. The processing steps S102 and S103 are performed by the switching control section 30. Thereafter, in Step S104, the switching section 10 converts the input AC voltage in accordance with the control signal and outputs the converted voltage to the selected phase. Finally, in Step S105, the filter section 104 converts the converted voltage into an output AC voltage. By performing this series of processing steps a number of times every half period of the input AC voltage, the input AC voltage can be converted into an output AC voltage with a relatively low frequency.

In this example, the control signal is sent to the switching section 10 synchronously with a zero cross of the input AC voltage. That is why the switching operation is performed inside of the switching section 10 when the voltage is zero. Consequently, the power loss involved with the switching operation can be reduced. Furthermore, since the input AC voltage is converted into an output AC voltage without being converted into a DC voltage, the conversion can get done with high efficiency. It should be noted that the configurations and operations of the switching section 10 and the switching control section 30 will be described in further detail later about a first embodiment.

Figure 1C:
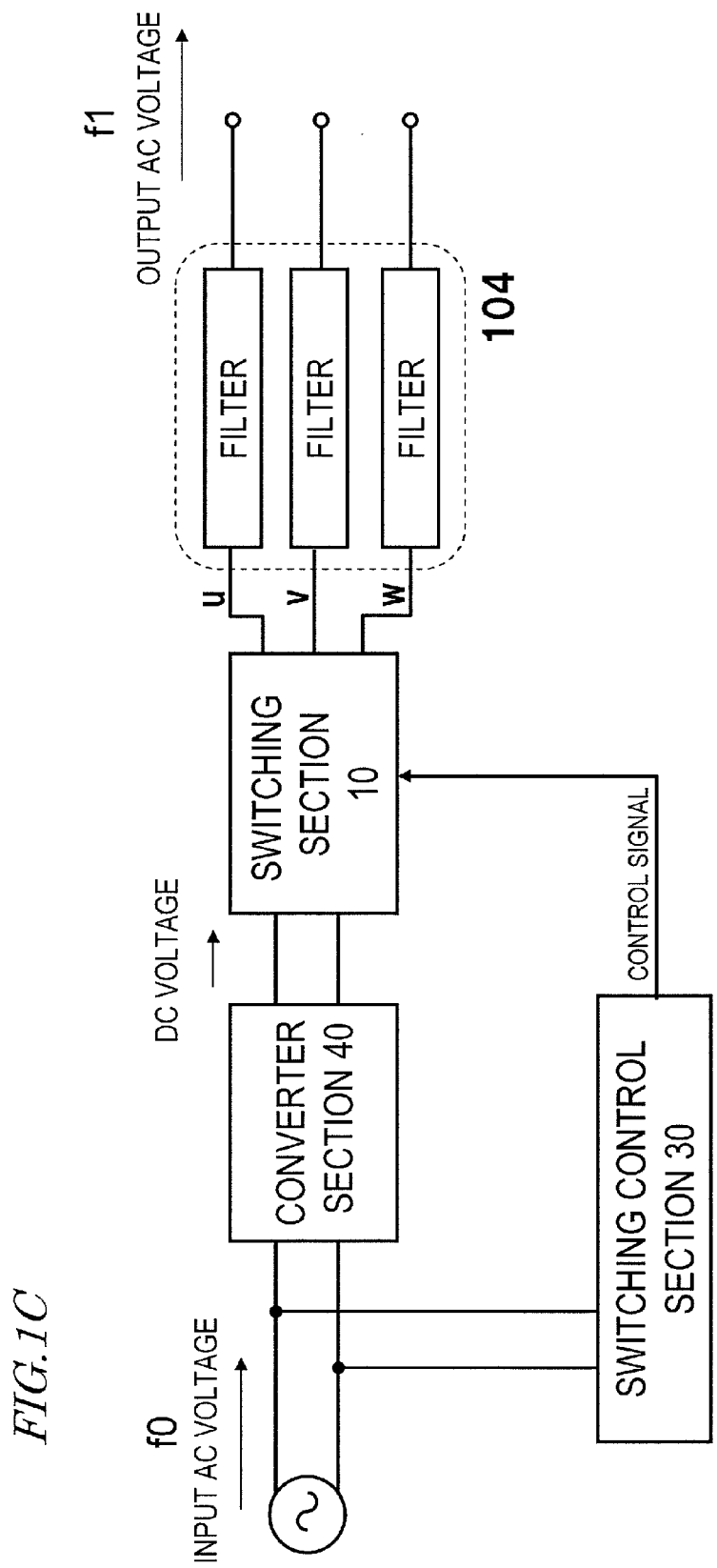
FIG. 1C Illustrates another exemplary general configuration for an AC converter according to an exemplary embodiment.

The AC converter does not have to have such a configuration but may also have any other configuration as well. FIG. 1C illustrates an alternative configuration for an AC converter according to the present disclosure. This AC converter is also configured to convert a single-phase input AC voltage with a frequency f0 into a three-phase output AC voltage with a frequency f1 that is lower than f0. This AC converter includes not only every component shown in FIG. 1A but also a converter section 40, which converts the input AC voltage into a DC voltage once and then supplies the DC voltage to the switching section 10.

In this example, the switching control section 30 also performs a pulse density modulation on a phase-by-phase basis and in response to a reference signal with the frequency f1, which is associated with the output AC voltage of each phase, synchronously with a zero cross of the input AC voltage. Then, the switching control section 30 generates the control signal according to a pulse generation status by the pulse density modulation and sends out the control signal to the switching section. In this example, the converter section 40 once converts the input AC voltage into a DC voltage, and therefore, the voltage applied to the switching section 10 is always positive. That is why the switching control section 30 controls the switching section 10 according to only the pulse generation status.

Figure 1D:
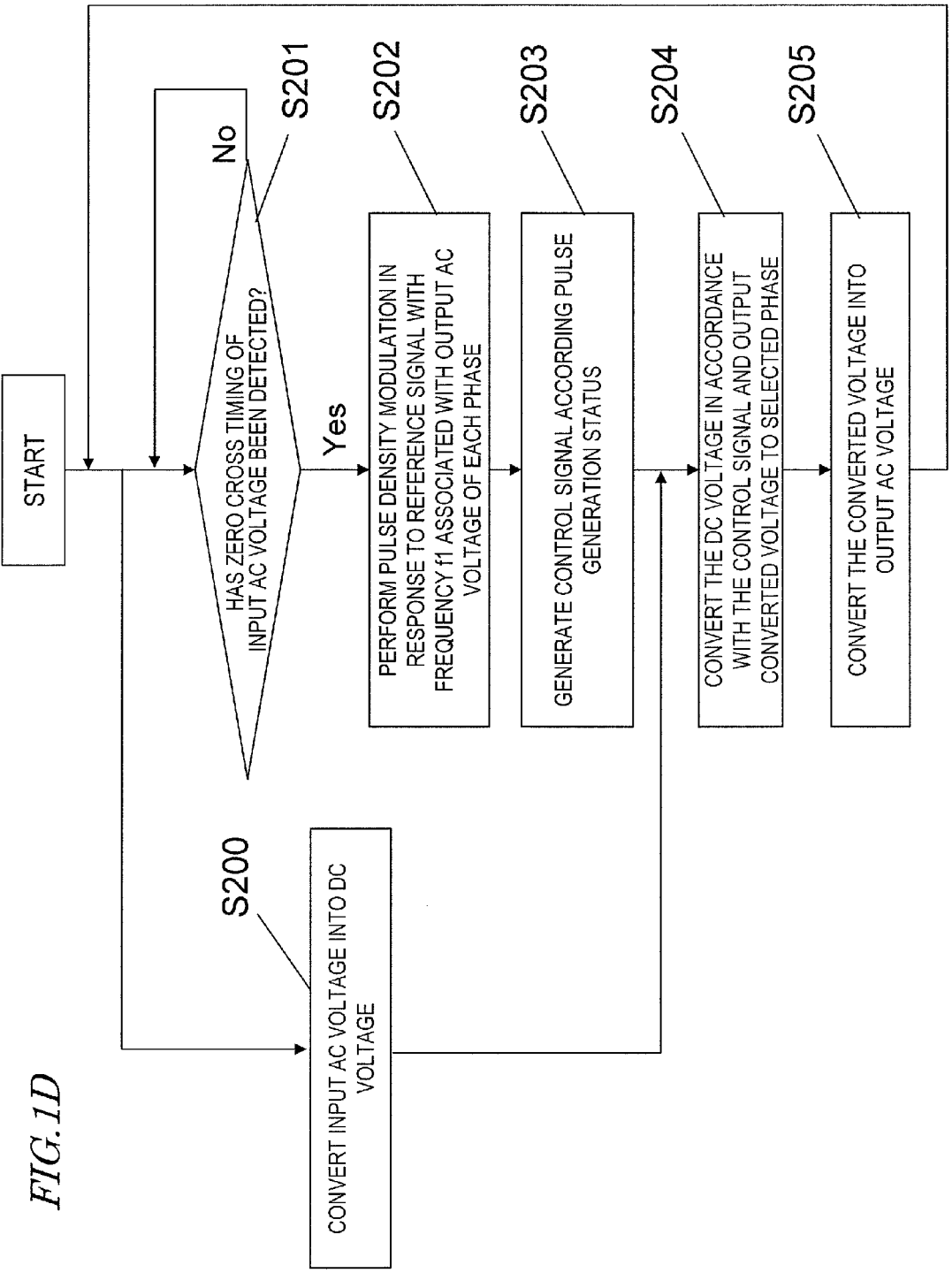
FIG. 1D A flowchart showing another procedure in which the AC converter according to the exemplary embodiment operates.

FIG. 1D is a flowchart showing the procedure of the operation of the AC converter shown in FIG. 1C. According to this procedure, in Step S200, the converter section 40 converts the input Ac voltage into a DC voltage. Next, in Step S201, it is determined whether or not a zero cross timing of the input AC voltage has been detected. If the answer is YES, the process advances to Step S202, in which a pulse density modulation is performed on a phase-by-phase basis and in response to a reference signal with the frequency f1, which is associated with the output AC voltage of each phase. Next, in Step S203, a control signal is generated according to a pulse generation status by the pulse density modulation. After Steps S200 and S203 have been performed, the switching section 10 converts in Step S204 the DC voltage supplied from the converter section 104 in accordance with the control signal and outputs the converted voltage to the selected phase. Finally, in Step S205, the filter section 104 converts the converted voltage into an output AC voltage. It should be noted that the processing step S200 and the processing steps S201 through S203 may be performed in parallel with each other. By performing this series of processing steps a number of times every half period of the input AC voltage, the input AC voltage can be converted into an output AC voltage with a relatively low frequency.

In the example illustrated in FIG. 1C, the control signal is also sent to the switching section 10 synchronously with a zero cross of the input AC voltage. That is why the switching operation is performed inside of the switching section 10 when the voltage is zero. Consequently, the power loss involved with the switching operation can be reduced. It should be noted that the configurations and operations of the switching section 10 and the switching control section 30 will be described in further detail later about a second embodiment.

In the foregoing description, each component of the AC converter is illustrated as a block with its own unique function. However, the operation of this AC converter can also get done even by making a processor execute a program that defines the processing to be performed by those functional blocks. The procedure of the processing of such a program is also just as shown in FIG. 1B or 1D.

Hereinafter, more specific embodiments of the present disclosure will be described. In the following description, any pair of components having the same or substantially the same function will be identified by the same reference numeral.

Embodiment 1

Figure 1E:
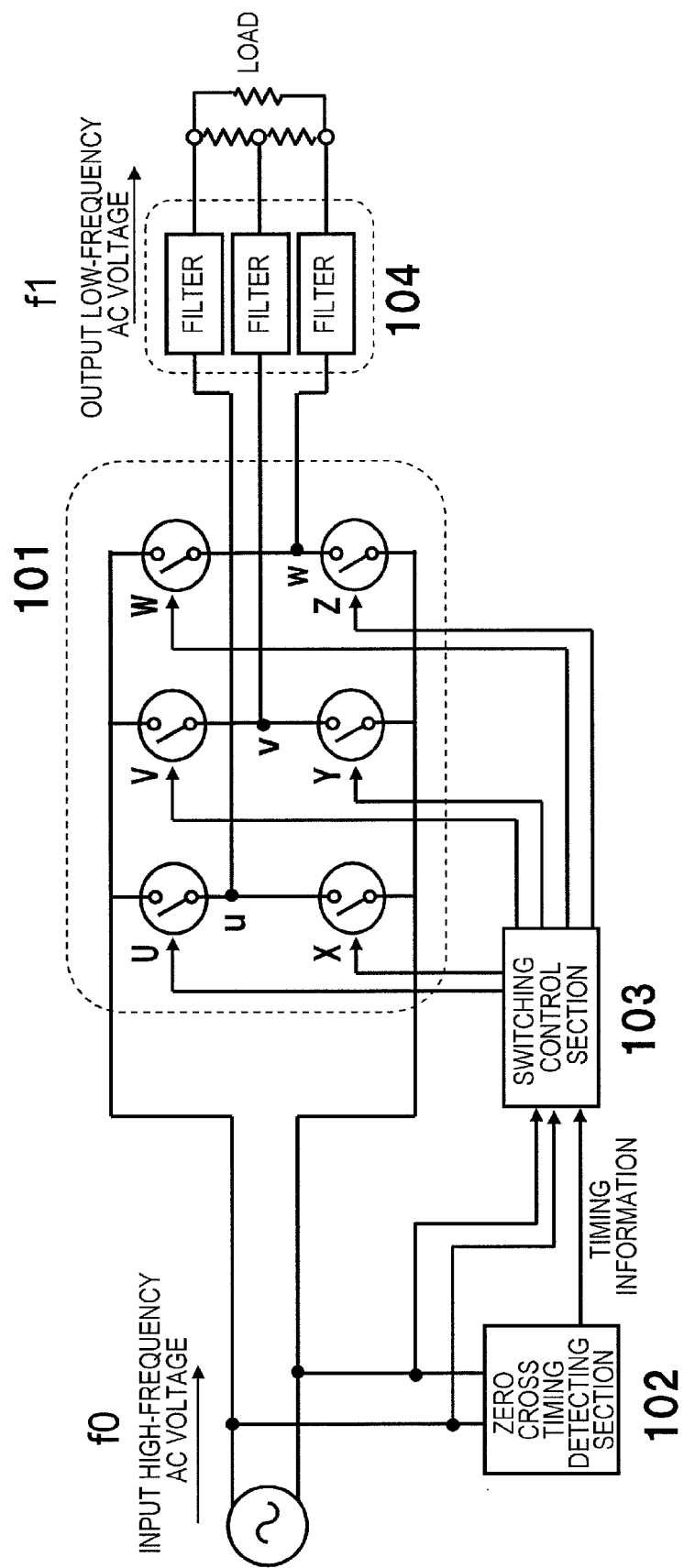
FIG. 1E A diagram illustrating a configuration for an AC converter according to a first embodiment.

First of all, an AC converter according to a first embodiment will be described. FIG. 1E is a block diagram illustrating a general configuration for an AC converter according to this embodiment. The AC converter of this embodiment is configured to convert a single-phase input AC voltage with a frequency f0 into a three-phase output AC voltage with a relatively low frequency f1. The AC converter includes a switching section 101 which supplies the input AC voltage to respective phases using multiple switching elements, a zero cross timing detecting section 102 which detects a timing when the input AC voltage goes zero (i.e., a zero cross timing), a switching control section 103 which controls the operations of the respective switching elements, and filters 104 which filter out the high frequency components of the output voltage of the switching section 101. A load is connected to follow the filters 104 and is supplied with an AC voltage with the frequency f1. The frequency f0 may be set to be 100 kHz or more, and the frequency f1 may be set to be 50 Hz which is as high as the frequency of the power supply system. Both the input AC voltage and the output AC voltage are supposed to be sinusoidal wave voltages. The input AC voltage may be a radio frequency (RF) voltage supplied from a power receiving section of a wireless power transmission system which uses resonant magnetic coupling, for example.

A single-phase AC voltage with the frequency f0 is input to the switching section 101, which includes switching elements U, V, W, X, Y and Z that operate in accordance with a control signal supplied from the switching control section 103. By using these switching elements U, V, W, X, Y and Z, the switching section 101 selectively outputs the input AC voltage to the filters 104 on the following stage that are connected to the respective phases of uv, vw and wu. In the following description, these uv, vw and wu phases will be sometimes simply referred to herein as u, V and w phases, respectively, for the sake of simplicity.

Among these switching elements, if the polarity of the input AC voltage with a relatively high frequency is positive, each of the switching elements U, V and W outputs a positive voltage to its associated phase. And these switching elements U, V and W will be sometimes referred to herein as a "first type of switches". On the other hand, if the polarity of the input AC voltage with the relatively high frequency is negative, each of the switching elements X, Y, and Z outputs a positive voltage to its associated phase. And these switching elements X, Y and Z will be sometimes referred to herein as a "second type of switches".

FIG. 2 illustrates exemplary configurations for each of those switching elements. Each switching element may have a configuration in which MOSFETs or IGBTs, which are ordinary semiconductor switching elements, are connected in series or in parallel to diodes as shown in FIG. 2(*a*) or connected together in a diode bridge. Alternatively, each switching element may also be made up of bidirectional switching elements such as reverse-blocking IGBTs as shown in FIG. 2(*b*). In any case, a control signal is supplied from the switching control section 103 to the gate of each of these switching elements.

Figure 3A:
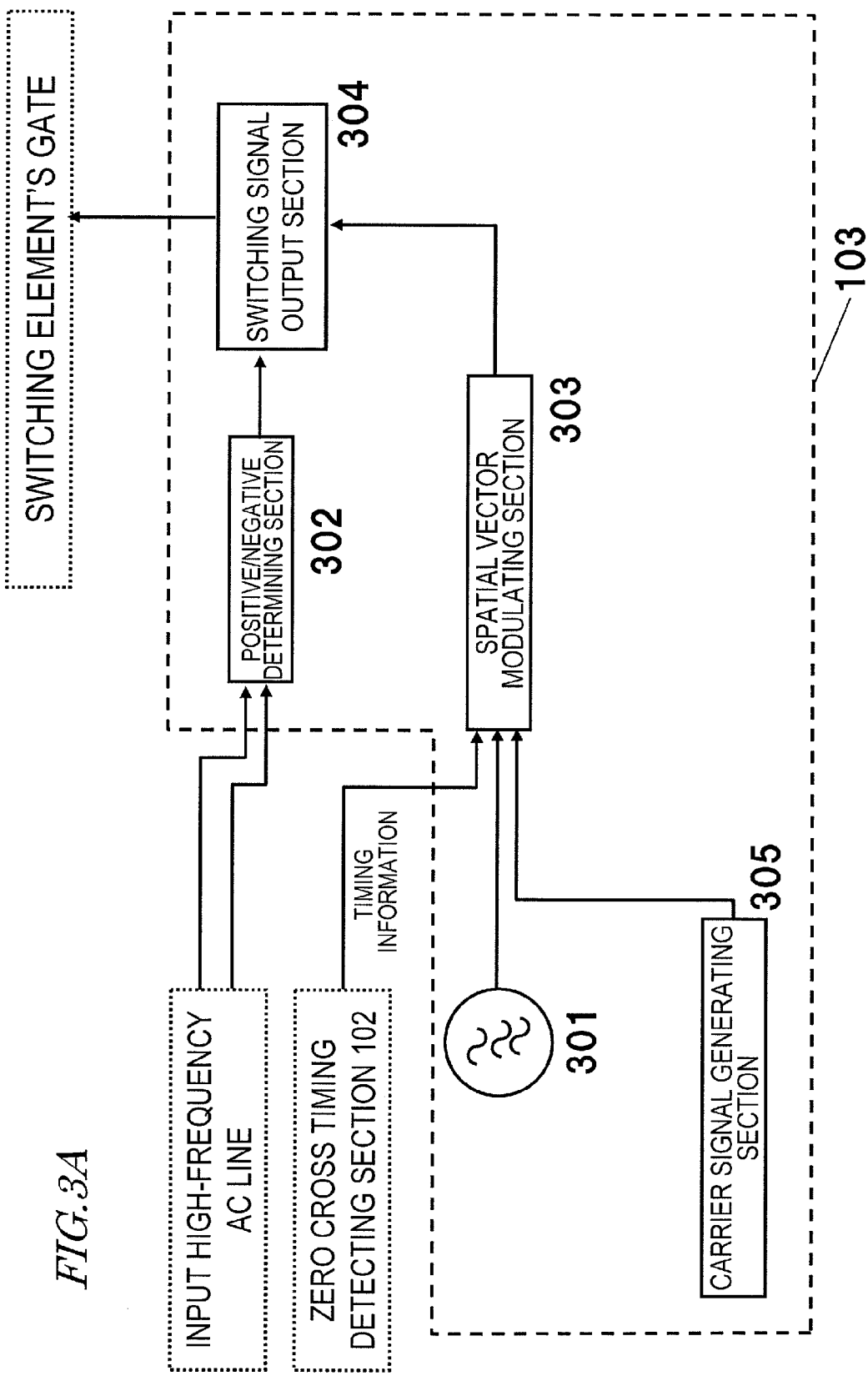
FIG. 3A Illustrates a configuration for a switching control section according to the first embodiment.

Next, the configuration and operation of the switching control section 103 will be described in detail. FIG. 3A illustrates a specific configuration for the switching control section 103. The switching control section 103 includes a reference sinusoidal wave generating section 301 which generates three-phase sinusoidal waves (as a reference signal) that have the same frequency as the output AC voltage of each phase (and which is equivalent to the reference signal generating section). The switching control section 103 also includes a positive/negative determining section 302 which determines the polarity of the input AC voltage to be either positive or negative. And the switching control section 103 further includes a space vector modulating section 303 which generates pulse trains associated with the respective phases by space vector modulation, a switching signal output section 304 which outputs a control signal to the gate of each switching element, and a carrier signal generating section 305 which generates a signal (i.e., a carrier signal) to be used as a reference for determining the switching time in the space vector modulation.

According to this embodiment, a pulse density modulation is performed by a modulation method called "space vector modulation". The space vector modulation is disclosed in Patent Documents Nos. 3 and 4, the entire contents of which are hereby incorporated by reference.

The space vector modulating section 303 receives timing information, indicating the timings when the voltage value of the input AC voltage goes zero, from the zero cross timing detecting section 102, and also receives a carrier signal from the carrier signal generating section 305. Also, the positive/negative determining section 302 is arranged so as to receive the output of an input high-frequency AC line. In this case, the carrier signal supplied from the carrier signal generating section 305 may be a triangular wave with a frequency fc, for example. The frequency fc of the carrier signal may be set to be higher than the frequency f1 of the reference signal supplied from the reference sinusoidal wave generating section 301 and lower than the frequency f0 of the input high-frequency power. The frequency fc may be set to satisfy f1<<fc<<f0.

The reference sinusoidal wave generating section 301 generates three-phase sinusoidal waves which have much lower power than the input AC power with a high frequency, which have three phases that are different from each other by 120 degrees ($2\pi/3$), and which have a frequency f1 of 50 Hz, and outputs those sinusoidal waves to the space vector modulating section 303 associated with the respective phases. In this case, the output of the reference sinusoidal wave generating section 301 is supposed to be a sinusoidal wave, of which the value goes sometimes positive and sometimes negative across zero.

Figure 3B:
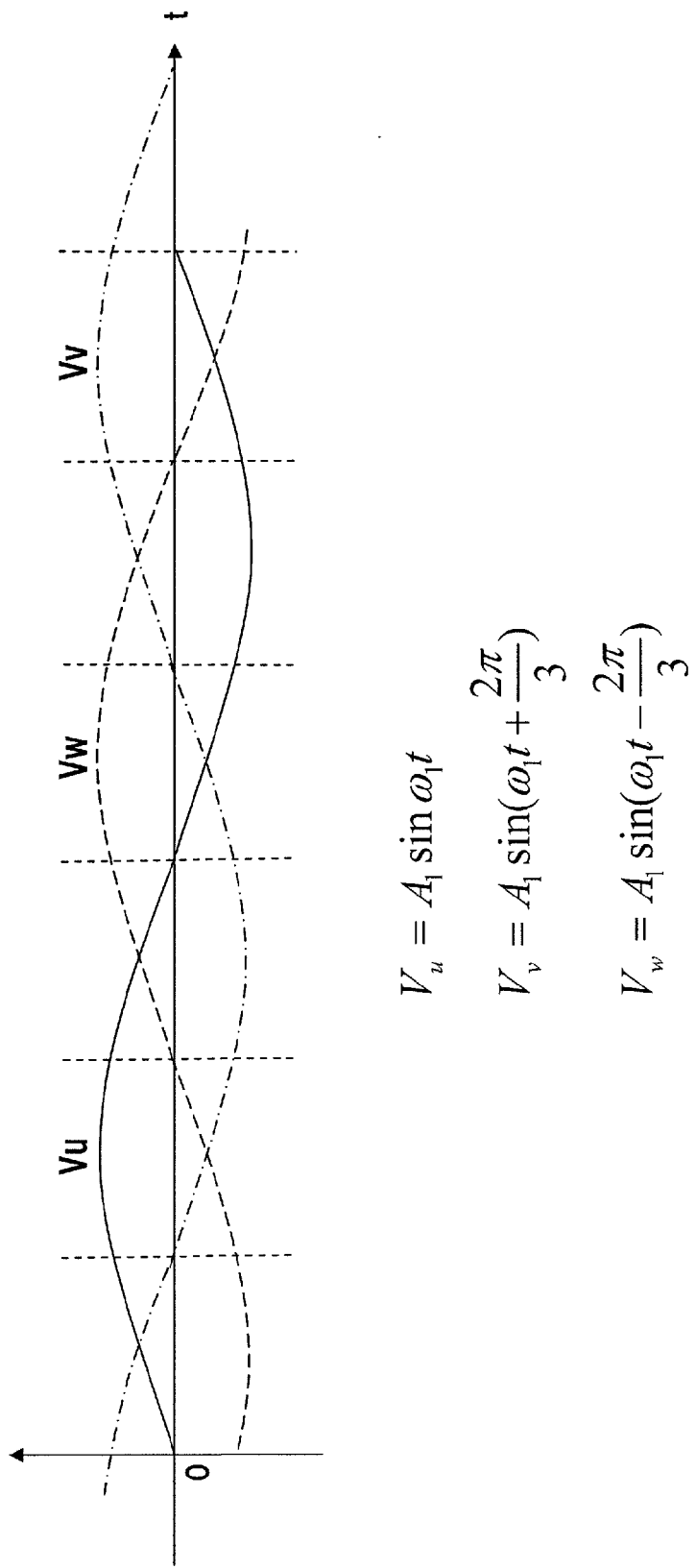
FIG. 3B Shows an example of three-phase sinusoidal waves output from a reference sinusoidal wave generating section.

FIG. 3B shows an example of three-phase sinusoidal waves output from the reference sinusoidal wave generating section 301. The voltages Vu, Vw and Vv of the three-phase sinusoidal waves are associated with the frequencies and phases of voltages to be output to the u, v and w phases, respectively, and therefore, their amplitudes are equal to each other and their phases are different from each other by $2\pi/3$. The sinusoidal waves Vu, Vv and Vw may be represented by the following Equations (1) to (3):

$$V_u = A_1 \sin \omega_1 t \quad (1)$$

$$V_v = A_1 \sin\left(\omega_1 t + \frac{2\pi}{3}\right) \quad (2)$$

$$V_w = A_1 \sin\left(\omega_1 t - \frac{2\pi}{3}\right) \quad (3)$$

where the amplitude is supposed to be A1, the angular velocity is supposed to be $\omega_1$ ($=2\pi$ f1), and a time when the phase of a sinusoidal wave voltage Vu corresponding to the u phase becomes zero is supposed to be the origin of the time coordinates. The origin of the time coordinates may be set to be an arbitrary time.

The space vector modulating section 303 performs a space vector modulation in accordance with the voltage values Vu, Vv and Vw of the three-phase sinusoidal waves received as instruction values. And in response to the carrier signal supplied from the carrier signal generating section 305 and the timing information provided by the zero cross timing detecting section 102, the space vector modulating section 303 outputs a pulse to the switching signal output section 304 synchronously with a zero cross of the voltage level of the input AC voltage.

Figure 3C:
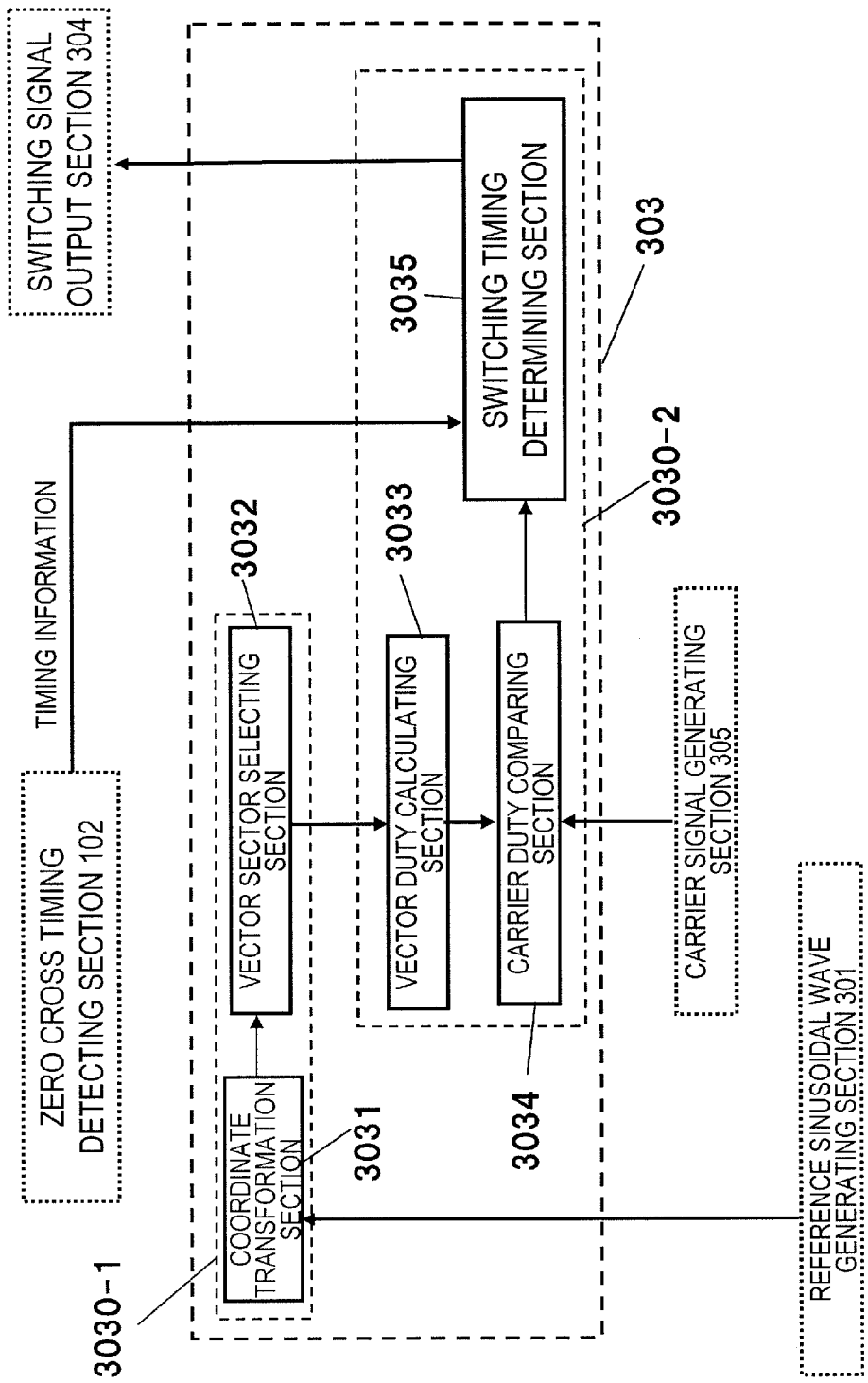
FIG. 3C Illustrates a configuration for a space vector modulating section according to the first embodiment.

FIG. 3C illustrates a configuration for the space vector modulating section 303, which includes a switching vector determining section 3030-1 that determines three vectors (switching vectors) defining a combination of switching elements to turn ON in accordance with the output of the reference sinusoidal wave generating section 301 and a switching state determining section 3030-2 that determines the duty ratio of the set of vectors determined and turn-ON timings represented by the respective vectors. The switching vector determining section 3030-1 includes a coordinate transformation section 3031 to transform a three-dimensional vector, of which the components are the values of the three-phase AC voltage supplied from the reference sinusoidal wave generating section 301, into a two-dimensional vector and a vector sector selecting section 3032 which determines three switching vectors by selecting a sector to which the transformed two-dimensional vector belongs. The switching state determining section 3030-2 includes a vector duty calculating section 3033 which calculates the duty of the three switching vectors, a carrier-duty comparing section 3034 which compares the duty and the carrier signal to each other, and a switching timing determining section 3035 which determines the timing of switching using those switching vectors based on the result of the comparison.

Hereinafter, it will be described how the switching control section 303 performs the pulse density modulation processing based on the space vector modulation.

Figure 4:
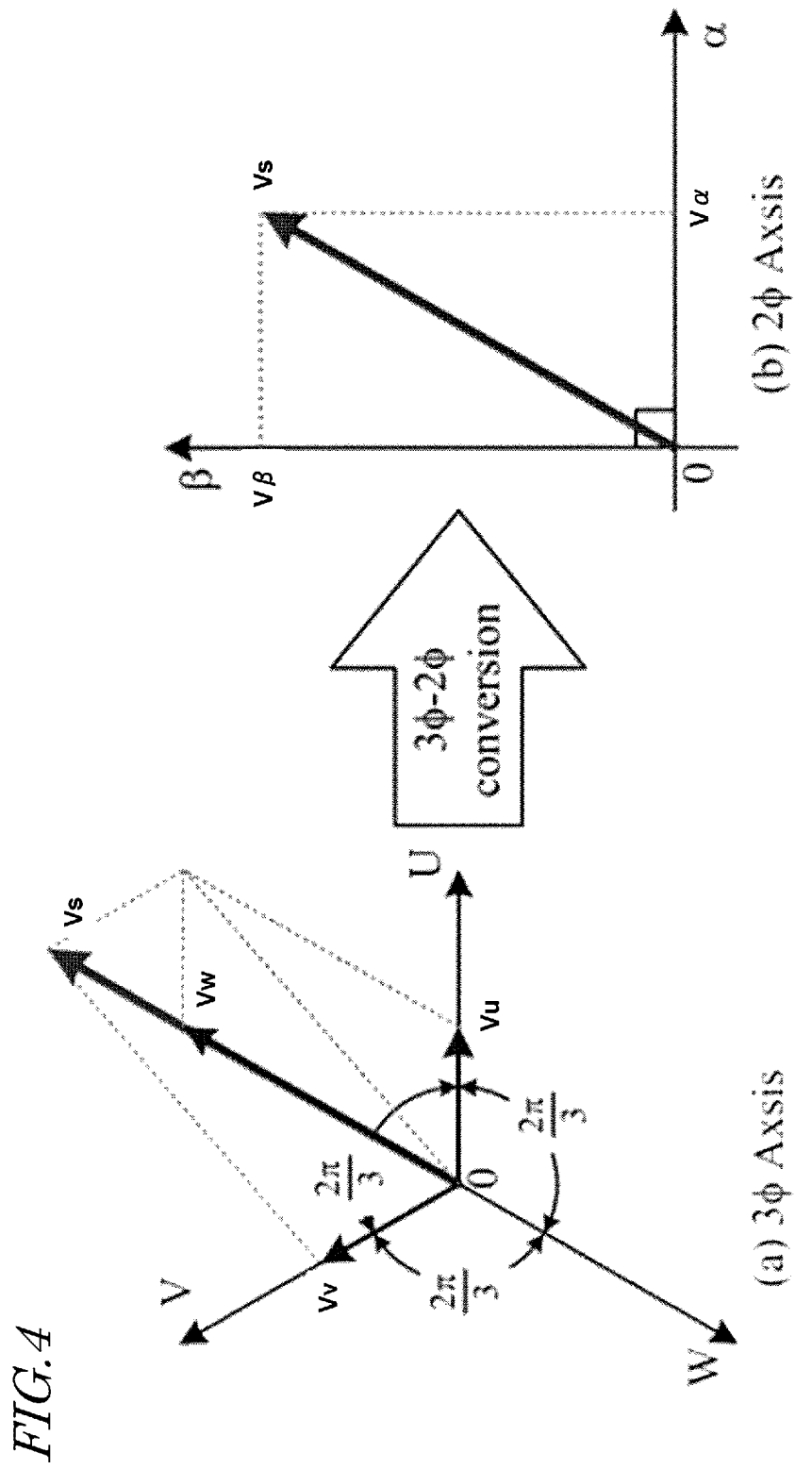
FIG. 4 Illustrates the principle of space vector modulation.

First of all, a three-phase to two-phase rest frame conversion will be described. FIG. 4 illustrates the concept of the three-phase to two-phase rest frame conversion. Suppose the values (i.e., three-phase equilibrium voltage instantaneous values) Vu, Vv and Vw supplied from the reference sinusoidal wave generating section 301 are represented by three instantaneous vectors Vu, Vv and Vw on the three axes U, V and W, which are defined on the plane so as to be different from each other by 2 π/3 degrees as shown in FIG. 4(a). Then, the three-phase AC voltage supplied from the reference sinusoidal wave generating section 301, i.e., the voltage to be output to the respective phases, can be represented by the synthetic instantaneous vector Vs given by the following Equation (4):

$$\vec{V}_s = \vec{V}_u + \vec{V}_v + \vec{V}_w \quad (4)$$

This synthetic instantaneous vector Vs is a vector which rotates at a constant angular frequency f1 and which has a constant magnitude.

Next, suppose this synthetic instantaneous vector is represented by an α axis corresponding to the U axis and a β axis that intersects with the α axis at right angles as shown in FIG. 4(b). In this case, the α and β components of Vs are identified by Vα and Vβ, respectively.

Figure 5:
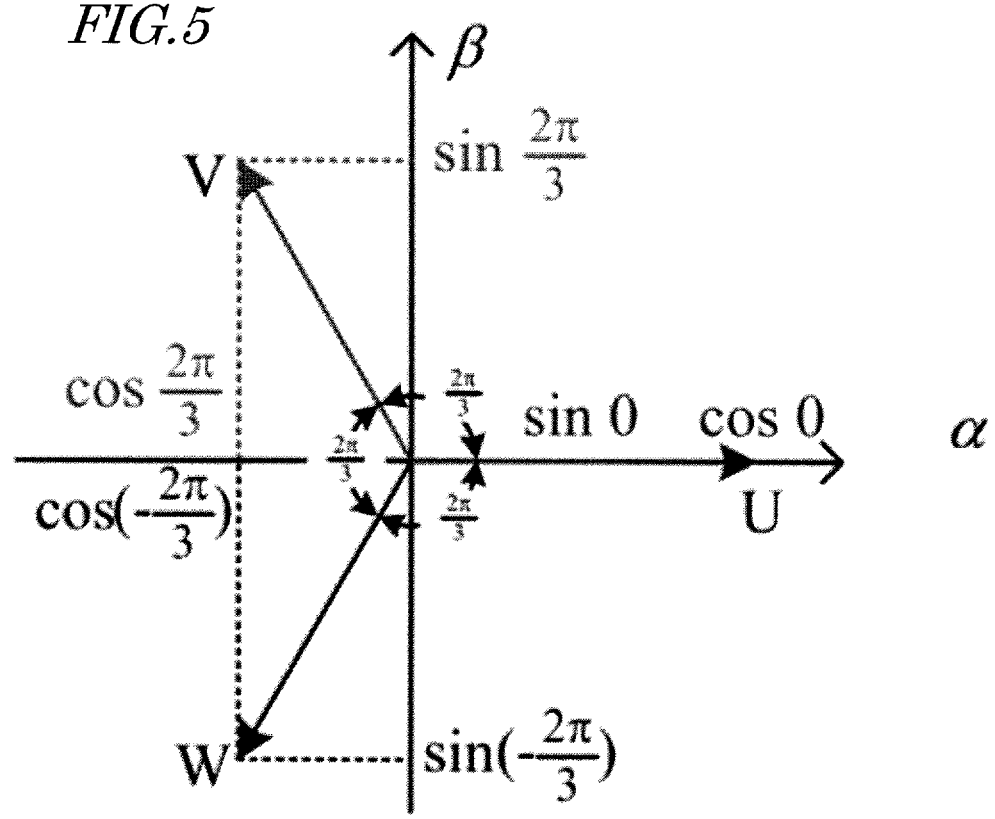
FIG. 5 Shows a relation between a three-phase coordinate system and a two-phase coordinate system.

Subsequently, transformation equations to make the three-phase to two-phase rest frame conversion are obtained. FIG. 5 shows a relation between a three-phase coordinate system and a two-phase coordinate system. In FIG. 5, shown are the magnitudes of vectors on the U, V and W axes that are projected onto the α and β axes. As can be seen from FIG. 5, Vα and Vβ can be represented by the following Equations (5):

$$\begin{cases} V_\alpha = V_u \cos 0 + V_v \cos \frac{2\pi}{3} + V_w \cos\left(-\frac{2\pi}{3}\right) \\ V_\beta = V_u \sin 0 + V_v \sin \frac{2\pi}{3} + V_w \sin\left(-\frac{2\pi}{3}\right) \end{cases} \quad (5)$$

If these equations are rewritten using a matrix, the following Equations (6) are obtained. In this case, to make a relative transformation without changing the amplitude of the voltage even after the transformation, the transformation matrix is multiplied by the constant ⅔:

$$\begin{pmatrix} V_\alpha \\ V_\beta \end{pmatrix} = \frac{2}{3} \begin{pmatrix} \cos 0 & \cos \frac{2\pi}{3} & \cos\left(-\frac{2\pi}{3}\right) \\ \sin 0 & \sin \frac{2\pi}{3} & \sin\left(-\frac{2\pi}{3}\right) \end{pmatrix} \begin{pmatrix} V_u \\ V_v \\ V_w \end{pmatrix} = \frac{2}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} V_u \\ V_v \\ V_w \end{pmatrix} \quad (6)$$

In accordance with the values (Vu, Vv, Vw) supplied from the reference sinusoidal wave generating section 301 as instruction values, the coordinate transformation section 3031 subjects the instruction values of the respective phases to the three-phase to two-phase rest frame conversion. As a result of this conversion, the voltage values of the three-phase sinusoidal waves supplied from the reference sinusoidal wave generating section 301 can be treated as rotational vectors with constant magnitudes.

Next, it will be described how to determine, by using these rotational vectors, whether the respective phases are conductive or not. The switching section 101 shown in FIG. 1E includes six switching elements U, V, W, X, Y and Z. Among these switching elements, each pair of switching elements U and X associated with the u phase, V and Y associated with the v phase, and W and Z associated with the w phase is controlled so that when one of these two switching elements is ON in each pair, the other switching element is OFF. Due to this constraint, the combinations of the conductivity states of all switching elements are determined by the combinations of the ON and OFF states of the three switching elements U, V and W that are drawn as the upper group in FIG. 1E. The number of those combinations is 2³=8.

Now let us define a vector space (U, V, W) that is represented by the ON and OFF states of respective phases. In the following example, the ON state will be indicated herein by "1" and the OFF state by "0". For example, if the U phase is in ON state (i.e., a power-supplied state) and if the V and W phases are in OFF state (i.e., a no-power-supplied state), then (U, V, W)=(1, 0, 0).

Figure 6:
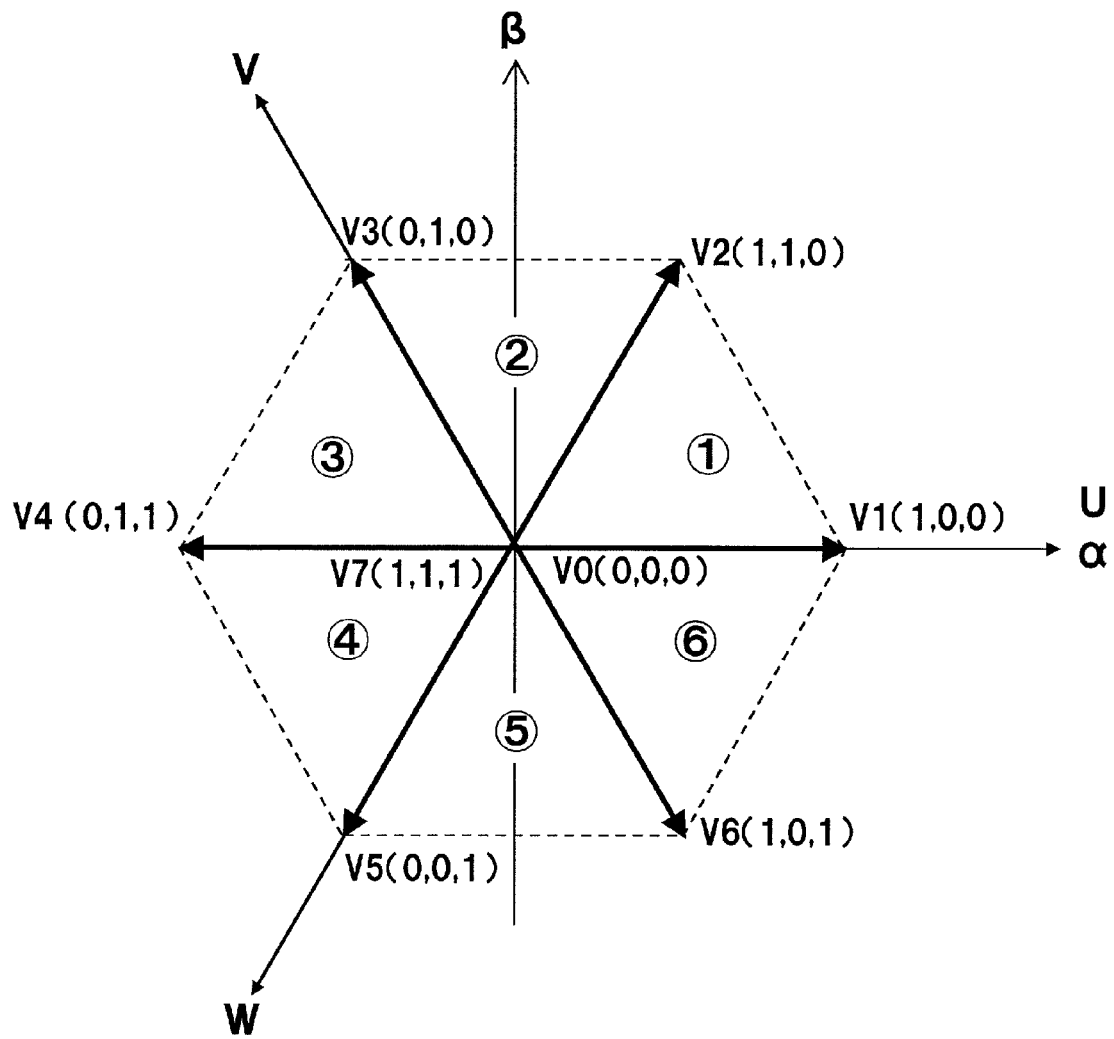
FIG. 6 Shows eight switching vectors and six sectors.

FIG. 6 shows how eight vectors indicating selectable switching states are plotted on a plane with coordinates that are represented by three axes U, V and W so that each pair of those axes has an angular difference of 120 degrees. As shown in FIG. 6, those eight vectors are represented as V0 (0, 0, 0), V1 (1, 0, 0), V2 (1, 1, 0), V3 (0, 1, 0), V4 (0, 1, 1), V5 (0, 0, 1), V6 (1, 0, 1) and V7 (1, 1, 1), respectively. In this case, V0 and V7 are zero vectors and V1, V3 and V5 are vectors on the U, V and W axes, respectively. In this description, these vectors V0 through V7 will be referred to herein as "switching vectors".

Suppose the area surrounded with these vectors V0 through V7 is divided into six sectors so that each pair of those sectors has an angular difference of 60 degrees. As shown in FIG. 6 and Table 1, the sector surrounded with the vectors V1 (1, 0, 0), V2 (1, 1, 0) and V0 (0, 0, 0) is defined to be Sector #1 and the sector numbers are supposed to be given counterclockwise from that sector on.

TABLE 1

| Sector # | Output voltage instructing phase angle range (deg) |
|---|---|
| 1 | 0 ≤ θ < 60 |
| 2 | 60 ≤ θ < 120 |
| 3 | 120 ≤ θ < 180 |
| 4 | 180 ≤ θ < 240 |
| 5 | 240 ≤ θ < 300 |
| 6 | 300 ≤ θ < 360 |

The vector sector selecting section 3032 determines to which sector the instruction value vector Vs (Vα, Vβ) such as the one shown in FIG. 4 which has been transformed by the coordinate transformation section 3031 belongs, and outputs, as a vector indicating the switching state for which three vectors defining the area surrounding the sector selected need to be set, the result to the vector duty calculating section 3033. As shown in Table 1, it is determined based on the phase θ of the vector Vs to which sector the instruction value vector Vs (Vα, Vβ) belongs. The phase θ of the vector Vs can be obtained by calculating the arctangent of Vβ/Vα.

The vector duty calculating section 3033 calculates the duty ratio, i.e., the ratio of the periods of time for which switching states represented by the respective vectors are output, based on the result of selection provided by the vector sector selecting section 3032. Hereinafter, it will be described how to determine the ratio of the respective output periods on the supposition that the sector provided is Sector #1, for example.

Figure 7:
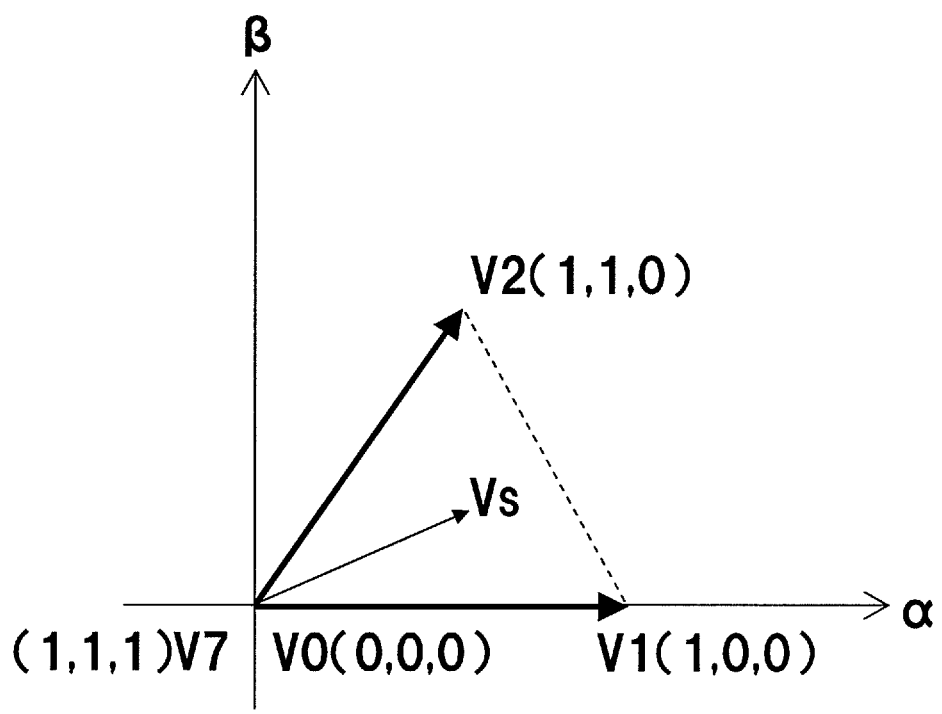
FIG. 7 Shows an exemplary instruction vector Vs in Sector #1.

FIG. 7 shows an instruction value vector Vs in a situation where the sector provided is Sector #1 and also shows vectors that form its surrounding area. If the sector provided is Sector #1, the vectors to select will be V1 (1, 0, 0), V2 (1, 1, 0) and V0 (0, 0, 0). Although V7 (1, 1, 1) is also shown in FIG. 7, this vector is not adopted in this embodiment because this vector means that power should be output to every phase. In this case, let us consider how to represent the instruction value vector Vs (Vα, Vβ) as a linear combination of the vectors V0, V1 and V2. Suppose V0=(V0α, V0β)=(0, 0), V1=(V1α, V1β)=(1, 0, 0) and V2=(V2α, V2β)=(1, 1, 0) are satisfied, and the output period ratios (duties) of the vectors V1 and V2 are t1 and t2, respectively, when one period of the carrier signal output from the carrier signal generating section 305 is one. Then, the output period ratio t0 of the vector V0 becomes 1−(t1+t2). That is to say, t0 can be calculated by obtaining t1 and t2.

In this case, the relation between the output period ratio of the respective vectors and the elements of the instruction value vector Vs can be represented by the following Equation (7):

$$\begin{pmatrix} V_\alpha \\ V_\beta \\ 1 \end{pmatrix} = \begin{pmatrix} V_{1\alpha} & V_{2\alpha} & V_{0\alpha} \\ V_{1\beta} & V_{2\beta} & V_{0\beta} \\ 1 & 1 & 1 \end{pmatrix}\begin{pmatrix} t_1 \\ t_2 \\ t_0 \end{pmatrix} = \begin{pmatrix} V_{1\alpha} & V_{2\alpha} & 0 \\ V_{1\beta} & V_{2\beta} & 0 \\ 1 & 1 & 1 \end{pmatrix}\begin{pmatrix} t_1 \\ t_2 \\ t_0 \end{pmatrix} \quad (7)$$

If only the terms related to t1 and t2 are extracted from Equation (7), the following Equation (8) can be obtained.

$$\begin{pmatrix} V_\alpha \\ V_\beta \end{pmatrix} = \begin{pmatrix} V_{1\alpha} & V_{2\alpha} \\ V_{1\beta} & V_{2\beta} \end{pmatrix}\begin{pmatrix} t_1 \\ t_2 \end{pmatrix} \quad (8)$$

In this case, the maximum A is defined by the following Equation (9):

$$A = \begin{pmatrix} V_{1\alpha} & V_{2\alpha} \\ V_{1\beta} & V_{2\beta} \end{pmatrix} \quad (9)$$

Then, according to the Cramer's rule, t1 and t2 can be represented by the following Equations (10):

$$\begin{cases} t_1 = \dfrac{1}{|A|}\begin{pmatrix} V_\alpha & V_{2\alpha} \\ V_\beta & V_{2\beta} \end{pmatrix} \\ t_2 = \dfrac{1}{|A|}\begin{pmatrix} V_{1\alpha} & V_\alpha \\ V_{1\beta} & V_\beta \end{pmatrix} \end{cases} \quad (10)$$

In this case, the determinant |A| is represented by the following Equation (11):

$$|A| = V_{1\alpha} \cdot V_{2\beta} - V_{2\alpha} \cdot V_{1\beta} \quad (11)$$

By performing these arithmetic operations, t1 and t2 can be obtained. In addition, by calculating t0=1−t1−t2, t0 can also be obtained. In this manner, the ratio of the durations of respective switching states represented by the three vectors V0, V1 and V2 can be determined. In the example described above, Sector #1 is supposed to be used. As for the other sectors #2 through #6, however, vectors defining the switching states and the ratio of the respective durations of those switching states can also be determined by similar processing.

Next, information indicating the ratio of the durations of respective switching states associated with the respective output vectors, which has been calculated by the vector duty calculating section 3033, is input to the carrier duty comparing section 3034. In response, the carrier duty comparing section 3034 normalizes the carrier signal supplied from the carrier signal generating section 3035 so that the carrier signal has a value of 0 to 1 per period, compares the normalized carrier signal to the ratio of durations of respective switching states provided, and outputs the result of this comparison to the switching timing determining section 3035.

Meanwhile, the zero cross timing detecting section 102 detects a time when the voltage value of the input AC voltage becomes equal to zero, and notifies the space vector modulating section 303 of the information detected as timing information. And based on the result of the comparison and the timing information, the switching timing determining section 3035 determines the durations of the respective switching states.

Hereinafter, it will be described how the switching timing determining section 3035 performs the processing of determining the durations of switching states on the supposition that Sector #1 has been selected, for example.

Figure 8:
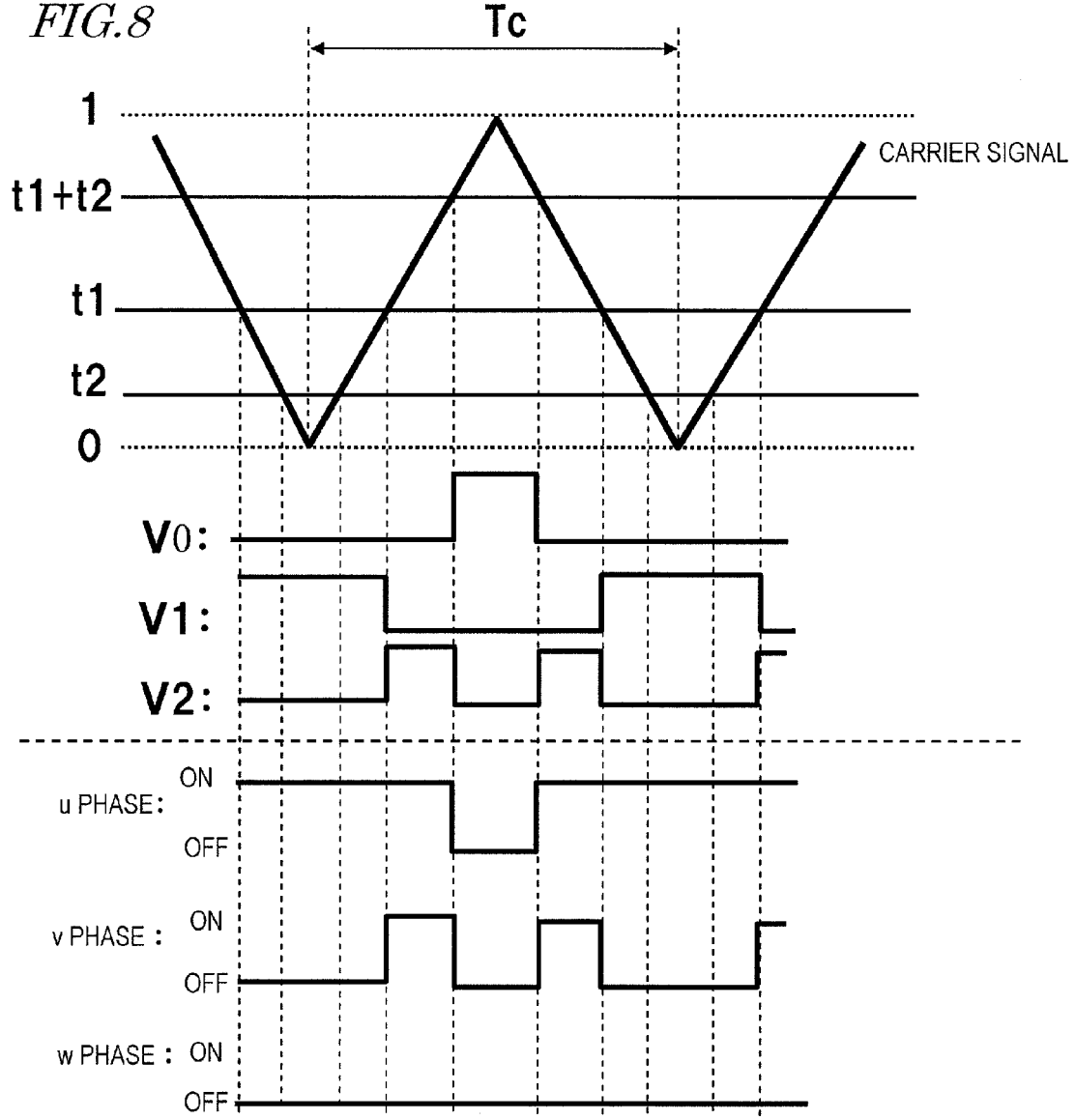
FIG. 8 Illustrates an exemplary method for determining a switching state by comparing the duration of each switching vector to a carrier signal.

FIG. 8 shows the principle of generating a switching signal by comparing a carrier signal to each duty ratio. By comparing t0, t1 and t2, each of which has a value of 0 to 1, to the carrier (i.e., a triangular wave with a minimum value of zero and a maximum value of one) having a control period Tc and an amplitude of one, the switching timing determining section 3035 determines the timing to be set for each switching state. As shown in FIG. 8, first of all, in a period in which the output period ratio t1 becomes greater than the normalized carrier signal, the switching timing determining section 3035 determines the ON and OFF states of the respective switching elements so that the switching pattern corresponds to the vector V1. That is to say, since the switching vector V1 (1, 0, 0) is selected in this period, conduction to the u phase is turned ON. Next, in a period in which the output period ratio t1+t2 (=1−t0) becomes smaller than the normalized carrier signal, the switching timing determining section 3035 determines the ON and OFF states of the respective switching elements so that the switching pattern corresponds to the vector V0. That is to say, since the switching vector V0 (0, 0, 0) is selected in this period, conduction to every phase is turned OFF. In the last remaining time period, the switching timing determining section 3035 determines the ON and OFF states of the respective switching elements so that the switching pattern corresponds to the vector V2. That is to say, since the switching vector V2 (1, 1, 0) is selected in a period in which the switching pattern corresponds to neither V1 nor V0, conduction to u and v phases is turned ON.

In the example described above, the timings are supposed to be set in the order of V1, V0 and V2. However, this is only an example and the timings do not have to be set in this order. However, to set the timings smoothly, the vectors may be compared to the carrier signal in such an order that a vector with no overlapping time period comes first. Alternatively, the comparison described above may be started with any appropriate vector and a time period that satisfies the condition may be selected for the next vector from the remaining time period other than the time period that has already been determined. In any case, timings may be set in any order as long as the time period ratio t0:t1:t2 is realized. As for the other sectors #2 through #6, the timing to set the conduction state represented by each switching vector can also be determined through similar processing.

In the embodiment described above, the timings are supposed to be set for the respective switching states by comparing the carrier signal to the output period ratio using a triangular wave. However, this is only an example. Alternatively, as long as the conduction states are determined as per the duty ratio of the respective switching vectors calculated, the timings may be set for the respective switching states by any other method.

Finally, the switching time determining section 3035 outputs, as the final ON and OFF state periods for the respective switching elements, pulse signals that last for a period of time obtained by multiplying the output period ratio of the respective phases shown in FIG. 8 by the control period Tc of the carrier signal, synchronously with the input of the timing information from the zero cross timing detecting section 102. The pulse signals that have been output on a phase by phase basis are then supplied to the switching signal output section 304.

The pulse signals supplied to the switching signal output section 304 have a continuous width. The switching signal output section 304 updates the switching signal at a point in time when the input AC voltage becomes equal to zero and quantizes (synchronizes) the switching signal in a half period of the input high-frequency voltage. In this manner, the switching signal output section 304 converts that half period portion of the input high-frequency power into a signal to be assigned to respective phases and outputs the signal as a control signal to be input to each switching element.

In this manner, the space vector modulating section 303 outputs pulse signals, of which the output period width changes at the same frequency as the frequency f1 of the reference sinusoidal wave generating section 301. As a result, the density of the input high-frequency half-wave pulses which pass through the switching elements while the pulse signals are ON changes at the frequency f1.

In the foregoing description, the output AC voltage is supposed to be a sinusoidal wave with a frequency of 50 Hz. However, the output AC voltage may also have any other waveform. If the output of the reference sinusoidal wave generating section 301 has an arbitrary waveform instead of the sinusoidal wave described above, an output AC voltage with that waveform can be obtained. Such a method for modulating the waveform into an arbitrary one with a variation in pulse density is called a "pulse density modulation (PDM)" method.

The positive/negative determining section 302 shown in FIG. 3A determines the current polarity of the input high-frequency AC voltage and provides the polarity information for the switching signal output section 304. Based on the pulse signals supplied from the space vector modulating section 303 and the polarity information provided by the positive/negative determining section 302, the switching signal output section 304 outputs a control signal to the respective switching elements of the switching section 101 to turn them ON and OFF.

FIG. 9 is a table of correspondence showing to which switching elements the switching signal output section 304 outputs a control signal with respect to various combinations of the polarity of the input AC voltage and the polarity of the output voltage between the respective phases. In FIG. 9, the input voltage polarity represents the polarity information provided by the positive/negative determining section 302, while the output voltage polarity indicates whether the three-phase AC voltage supplied from the reference sinusoidal wave generating section 301 is positive or negative. For example, if a positive voltage needs to be applied between the u and v phases when the input voltage polarity is positive, the switching signal output section 304 turns the switching elements U and Y ON at the same time. On the other hand, if a positive voltage needs to be applied between the u and v phases when the input voltage polarity is negative, the switching signal output section 304 turns the switching elements V and X ON at the same time. By turning the switching elements U, V, W, X, Y and Z ON and OFF in accordance with this table of correspondence, the switching signal output section 304 distributes the pulses to be applied so that if a voltage corresponding to a half wavelength of the input AC voltage is supposed to be one pulse, a variation in pulse density per unit time between the respective phases becomes a three-phase sinusoidal wave. To avoid a short-circuit on the output end, the switching control section 103 performs an exclusive control so as to prevent the switching elements U and X, V and Y, or W and Z from turning ON simultaneously.

The table of correspondence shown in FIG. 9 may be stored as a table in a memory (not shown). And by having the switching control section 103 make reference to that table, the control described above is realized. Alternatively, the switching control section 103 may also have its circuit configuration designed in advance so as to operate in accordance with the table of correspondence.

By getting such a control done by the switching control section 103, the switching section 101 outputs a train of pulses, each of which is a voltage corresponding to a half wavelength of the input AC voltage. The pulse train thus output is supplied to the filters 104, which are arranged with respect to respective phases.

Each of the filters 104 removes high-frequency components from the output pulse train supplied from the switching section 101 and provides an AC voltage with a low frequency of 50 Hz as a final output. Each filter 104 is a low-pass filter consisting of an inductor and a capacitor. Normally, supposing the input AC voltage has a frequency f0 and the output is provided by n phases, harmonic noise can be removed effectively by setting the cutoff frequency of the filter to be f0/(10× n). For example, if f0 is 100 kHz and if the output needs to be supplied to three phases, the cutoff frequency may be set to be approximately 33.3 kHz.

Figure 10:
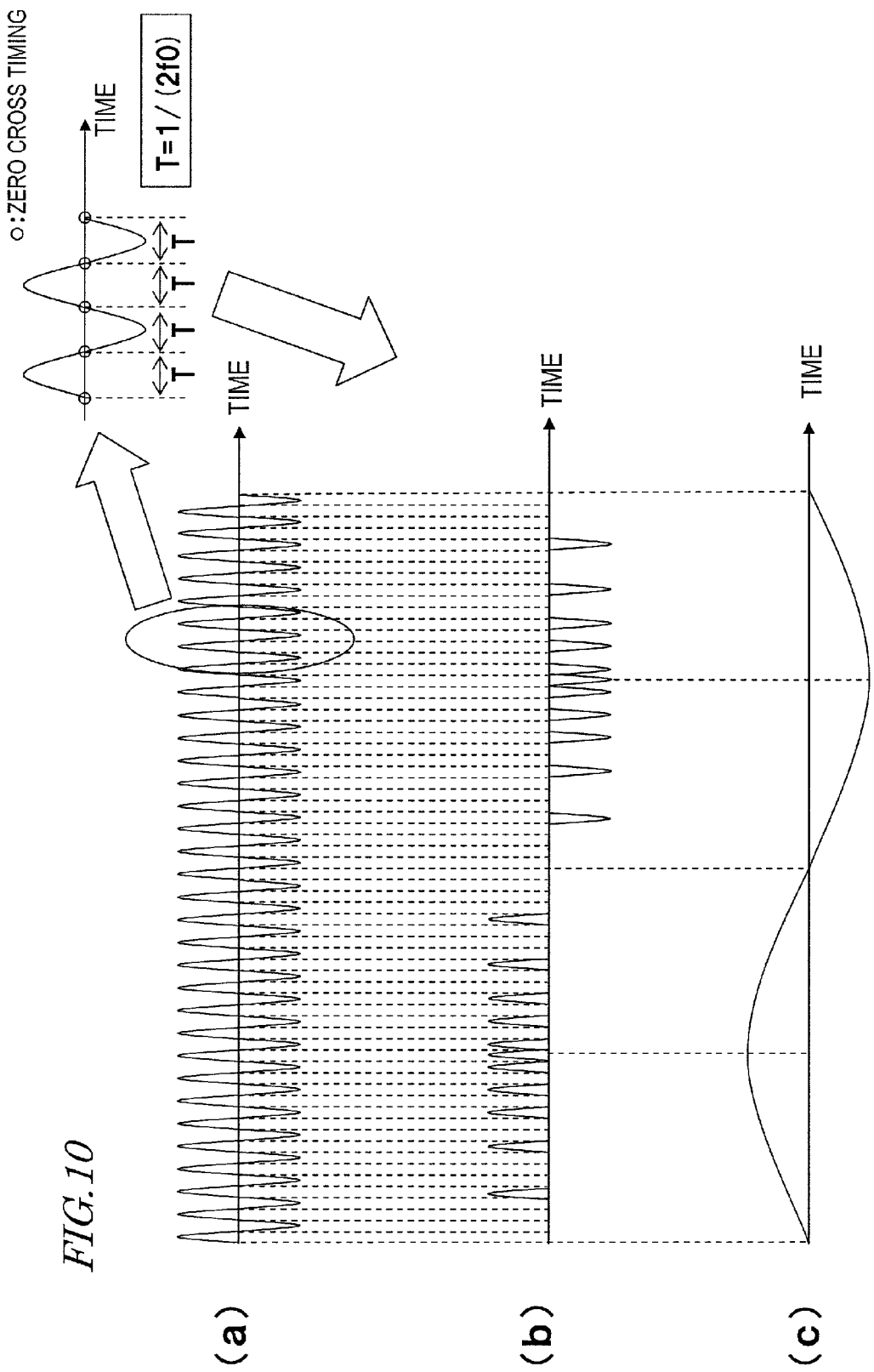
FIG. 10 Shows the waveforms of respective voltages to apply according to the first embodiment, wherein portion (a) illustrates the waveform of an input AC voltage, portion (b) illustrates the output waveform of a switching section, and portion (c) illustrates the output waveform of a filter.

FIG. 10 shows a relation between the input high-frequency AC voltage, the output of the switching section 101, and the output waveform of a filter 104 associated with one phase. Portion (a) of FIG. 10 shows how the input high-frequency AC voltage changes with time at the frequency f0. Portion (b) of FIG. 10 shows how the output of the switching section 101 changes with time. Since the ON and OFF states of the switches are controlled at a zero cross timing of the input AC voltage, a pulse train, of which the density changes in a sinusoidal wave pattern, is output. Portion (c) of FIG. 10 shows how the output of the filter 104 may change with time. Since the density of the output of the switching section 101 changes in a sinusoidal wave pattern at a frequency of 50 Hz, an AC voltage with a frequency of 50 Hz is output from the filter 104. As shown in FIG. 10, the input high-frequency AC voltage can be directly converted into an AC voltage with a low frequency of 50 Hz even without being converted into a DC voltage. As a result, power conversion can get done with high efficiency.

As can be seen, the AC converter of this embodiment can convert an AC power with a relatively high frequency into an AC power with a relatively low frequency and output the converted AC power by pulse density modulation based on the space vector modulation. According to the space vector modulation of this embodiment, a sector is determined based on the phase of the vector to be defined by three reference sinusoidal waves, and the conduction state of each switching element is controlled using the three switching vectors that form the sector thus determined. As a result, the vector transition angle due to switching transition is always kept within 30 degrees. Consequently, compared to a situation where a pulse density modulation by Δ-Σ modulation is adopted, generation of reverse current and clamp of the output voltage can be suppressed, and the decrease in conversion efficiency can be minimized.

Optionally, in order to always keep the vector transition angle equal to or smaller than 30 degrees, a control operation may be performed so that before and after the sector shown in FIG. 6 is switched, the state is always changed into a zero vector V0 state. By performing such a control, it is possible to avoid changing the state from the vector V1 into the vector V3 directly, for example.

Embodiment 2

Hereinafter, an AC converter according to a second embodiment will be described.

Figure 11:
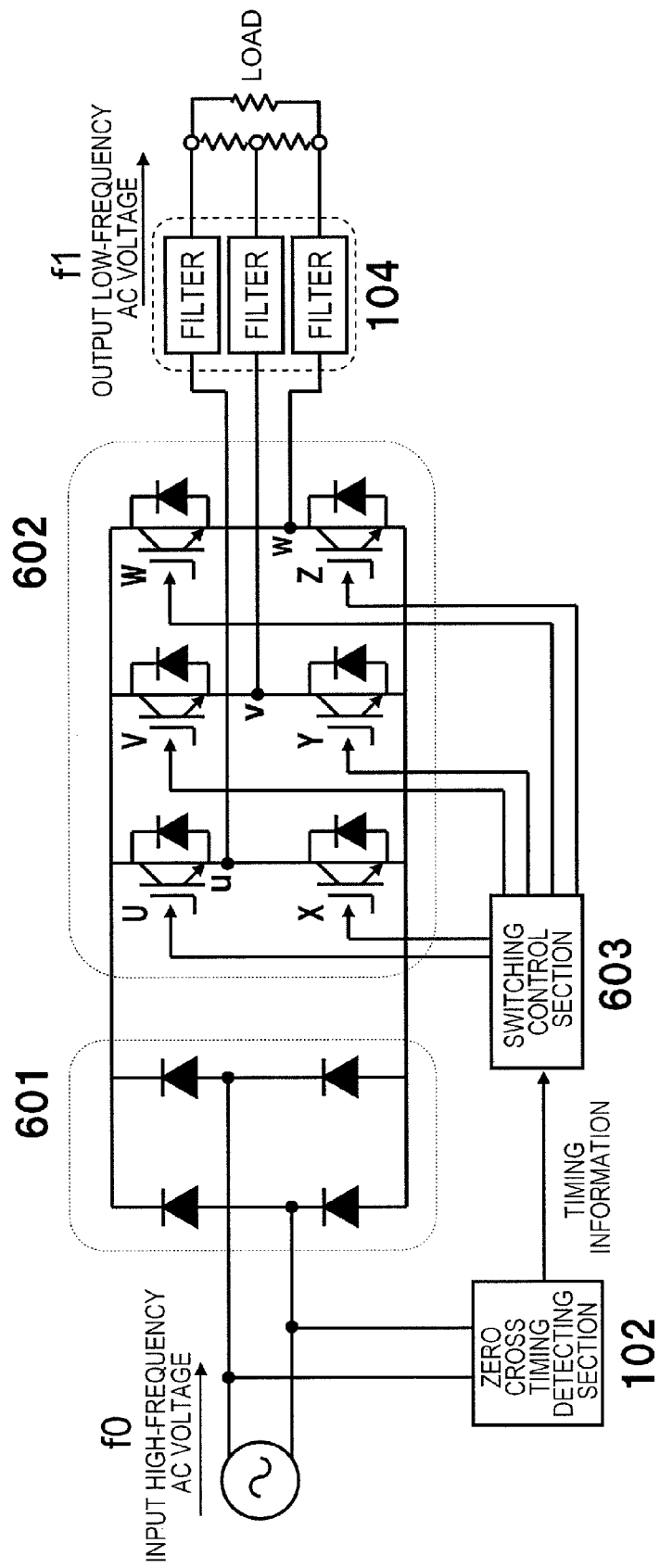
FIG. 11 Illustrates a configuration for an AC converter according to a second embodiment.

FIG. 11 is a block diagram illustrating a general configuration for an AC converter according to this embodiment. The AC converter of this embodiment includes a converter section 601 with a rectifying function, which is arranged before the switching section 602 in order to convert the input AC voltage into a DC voltage once, which is a major difference from the AC converter of the first embodiment described above. Thus, the following description of this second embodiment will be focused on such a difference from the first embodiment, and their common features will not be described all over again to avoid redundancies.

The AC converter of this embodiment includes the converter section 601 which converts an AC voltage into a DC voltage, a switching section 602 which converts the input DC voltage into an AC voltage and supplies the AC voltage to respective phases, a zero cross timing detecting section 102 which detects a timing when the input AC voltage goes zero, a switching control section 603 which controls the operations of the respective switching elements, and filters 104 which filter out the high frequency components of the output voltage of the switching section 101. A load is connected to follow the filters 104 and is supplied with an AC voltage with the frequency f1 as in the first embodiment described above. The frequency f0 may be set to be 100 kHz or more, and the frequency f1 may be set to be 50 Hz, which is as high as the frequency of the power supply system. Both the input AC voltage and the output AC voltage are supposed to be sinusoidal wave voltages.

The converter section 601 is implemented as a diode bridge and rectifies the single-phase input AC voltage with a frequency f0, thereby converting the AC voltage into a train of positive pulses with a frequency 2f0, of which one pulse is a voltage corresponding to a half wavelength of the AC voltage. The switching section 602 includes switching elements U, V, W, X, Y and Z that operate in accordance with a control signal supplied from the switching control section 603. By turning these switching elements U, V, W, X, Y and Z ON and OFF, the switching section 602 selectively outputs the input pulse train to the filters 104 that are connected to the respective phases of u, v and w. In this case, each switching element may be implemented as an MOSFET or an IGBT, which is a normal semiconductor switching element. As a control signal for each switching element, the output of the switching control section 603 is applied to the gate of the switching element.

Figure 12:
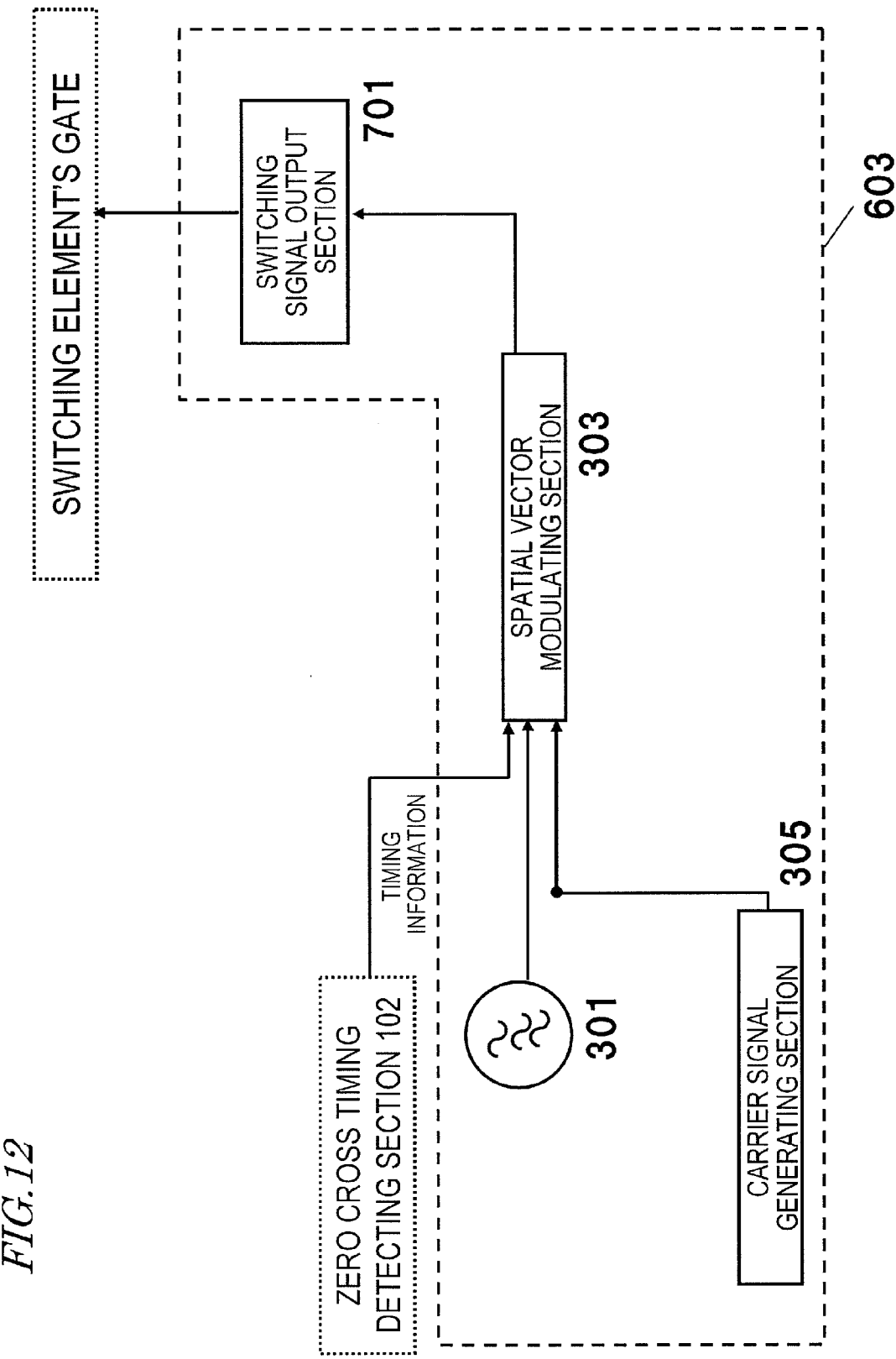
FIG. 12 Illustrates a configuration for a switching control section according to the second embodiment.

Next, the configuration and operation of the switching control section 603 will be described in detail. FIG. 12 illustrates a specific configuration for the switching control section 603. The switching control section 603 includes a reference sinusoidal wave generating section 301, a space vector modulating section 303, and a switching signal output section 701. The zero cross timing detecting section 102 detects timings when the voltage value of the input AC voltage goes zero and notifies the space vector modulating section 303 of the information detected as timing information.

The reference sinusoidal wave generating section 301 generates three-phase sinusoidal waves which have much lower power than the input AC power with a high frequency, which have three phases that are different from each other by 120 degrees, and which have a frequency of 50 Hz, and outputs those sinusoidal waves to the space vector modulating section 303 associated with the respective phases. In this case, the space vector modulating section 303 performs space vector modulation as in the first embodiment described above in accordance with the supplied sinusoidal wave value as an instruction value. Then, in accordance with the timing information provided, the space vector modulating section 303 outputs pulses to the switching signal output section 701 synchronously with a zero cross of the voltage level of the input AC voltage. In this case, the waveform of the output pulses, which represents a variation in ON time, becomes a sinusoidal wave with a frequency of 50 Hz just like the sinusoidal wave generated by the reference sinusoidal wave generating section 301. Based on the pulse signals supplied from the space vector modulating section 303, the switching signal output section 701 outputs a control signal to the respective switching elements of the switching section 602 to turn them ON and OFF.

FIG. 13 is a table of correspondence showing to which switching elements the switching signal output section 701 outputs a control signal with respect to the output voltage polarities in respective phases according to this embodiment. For example, if a positive voltage needs to be applied between the u and v phases, the switching signal output section 701 turns the switching elements U and Y ON at the same time. On the other hand, if a negative voltage needs to be applied between the u and v phases, the switching signal output section 701 turns the switching elements V and X ON at the same time. To avoid a short-circuit on the output end, the switching control section 701 performs an exclusive control so as to prevent the switching elements U and X, V and Y, or W and Z from turning ON simultaneously. In this manner, the switching control section 603 performs the space vector modulation on the pulse train supplied from the converter section 601, thereby performing a PDM modulation.

Figure 14:
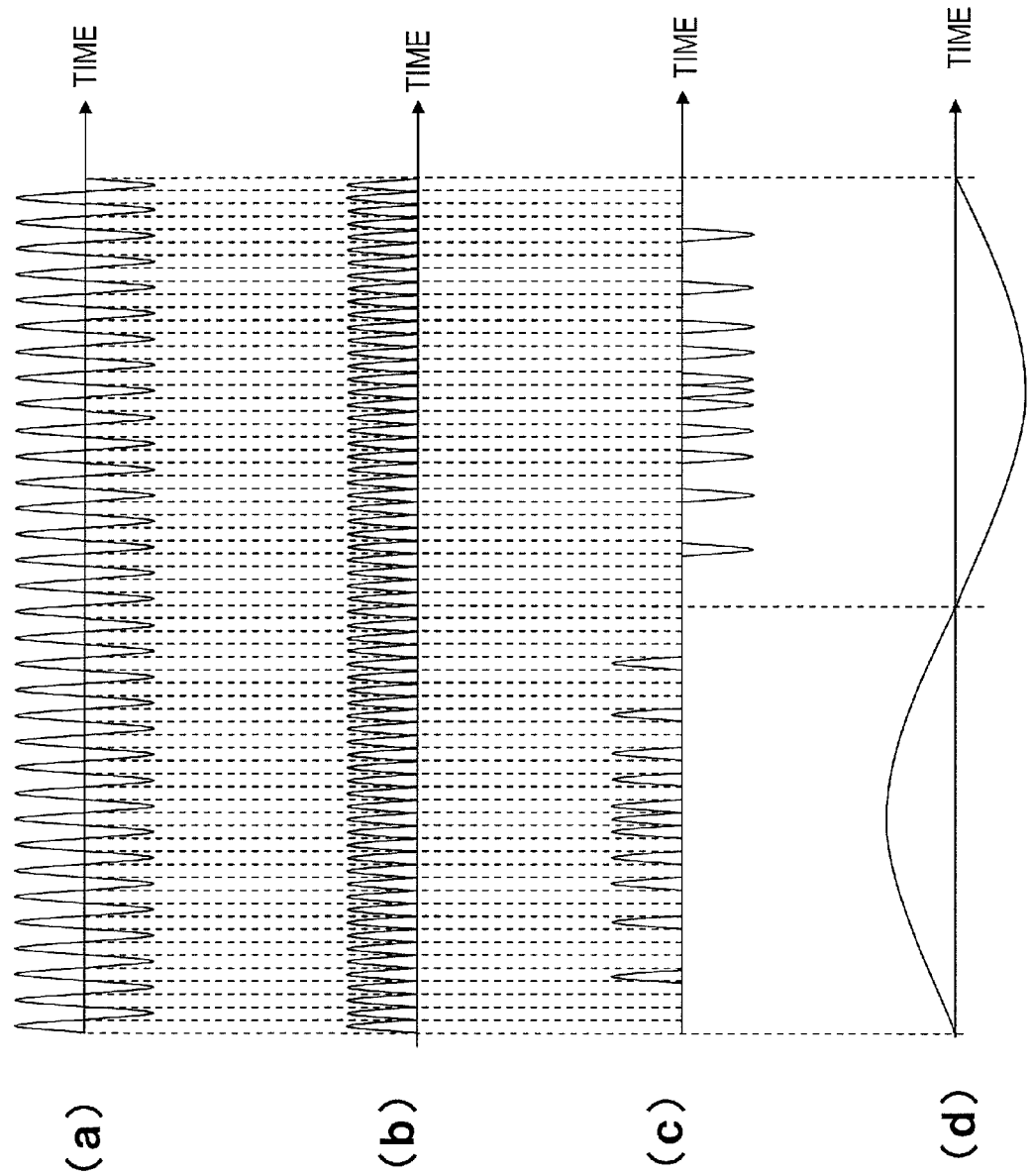
FIG. 14 Shows the waveforms of respective voltages to apply according to the second embodiment, wherein portion (a) illustrates the waveform of an input AC voltage, portion (b) illustrates the output waveform of a converter section, portion (c) illustrates the output waveform of a switching section, and portion (d) illustrates the output waveform of a filter.

Each of the filters 104 removes high-frequency components from the output pulse train supplied from the switching section 602 and provides an AC voltage with a low frequency of 50 Hz as a final output. Portions (a) through (d) of FIG. 14 show the waveform of the input AC voltage (with a frequency f0), the output waveform of the converter section 601 (rectified waveform with a pulse which T=1/(2f0)), the output waveform of the switching section 602, and the output waveform of a filter 104 associated with one phase (with a frequency of 50 Hz). As shown in portion (a) of FIG. 14, the input high-frequency AC voltage is converted by the converter section 601 into a positive half-wave train, which is then converted by the switching section 602 into a PDM-modulated half-wave train as shown in portion (c) of FIG. 14. Eventually, the PDM-modulated half-wave train is converted into a low-frequency AC voltage by being subjected to low-pass filtering by the filters 104 as shown in portion (d) of FIG. 14.

As described above, according to this embodiment, switching is done when the input high-frequency AC voltage is zero, and therefore, the input high-frequency AC voltage can be converted into an AC voltage with a low frequency of 50 Hz efficiently. In the embodiment described above, the zero cross timing detecting section 102 is supposed to detect a time when the input high-frequency AC voltage goes zero. Alternatively, the zero cross timing detecting section 102 may also be designed to detect a time when the output voltage of the converter section 601 goes zero.

Figure 15:
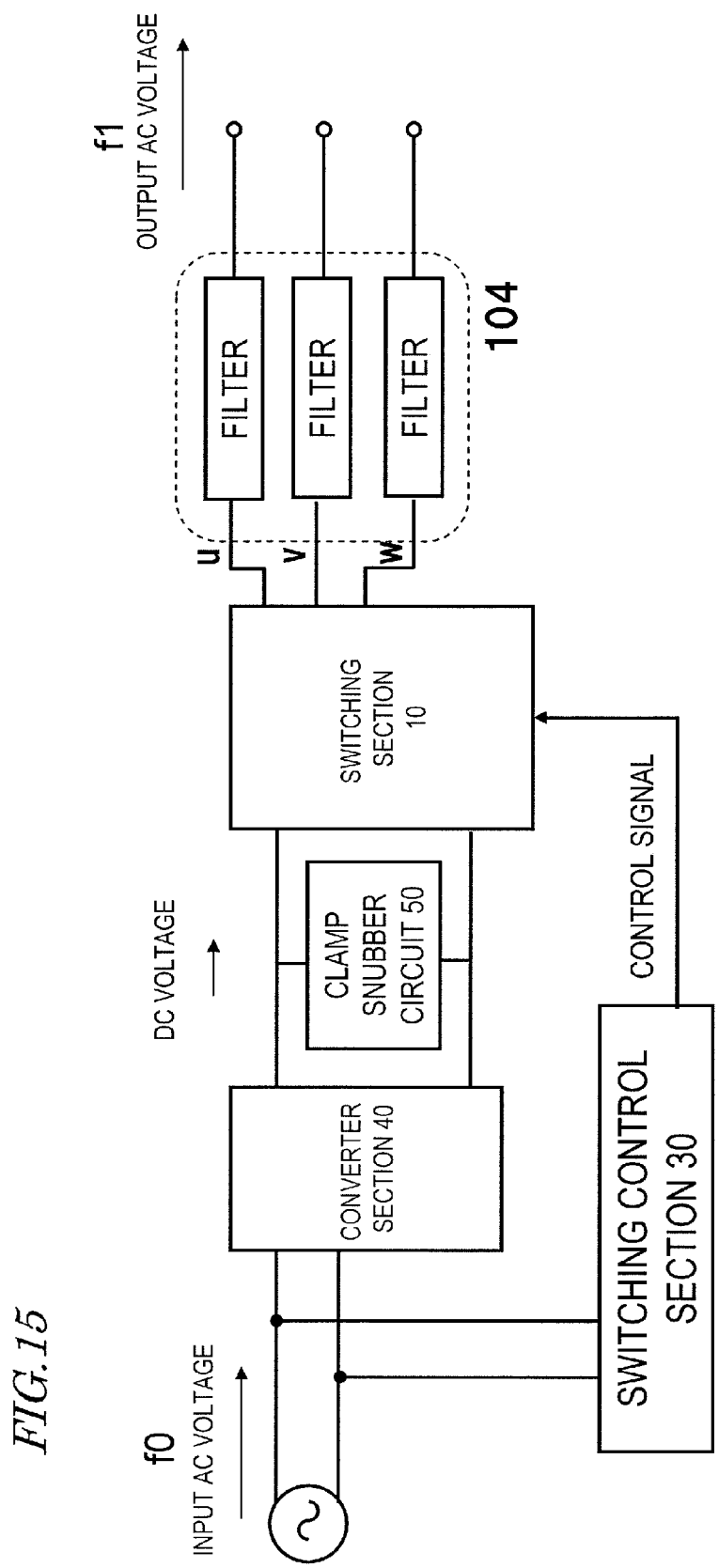
FIG. 15 Illustrates a configuration including a clamp snubber circuit.
Figure 16:
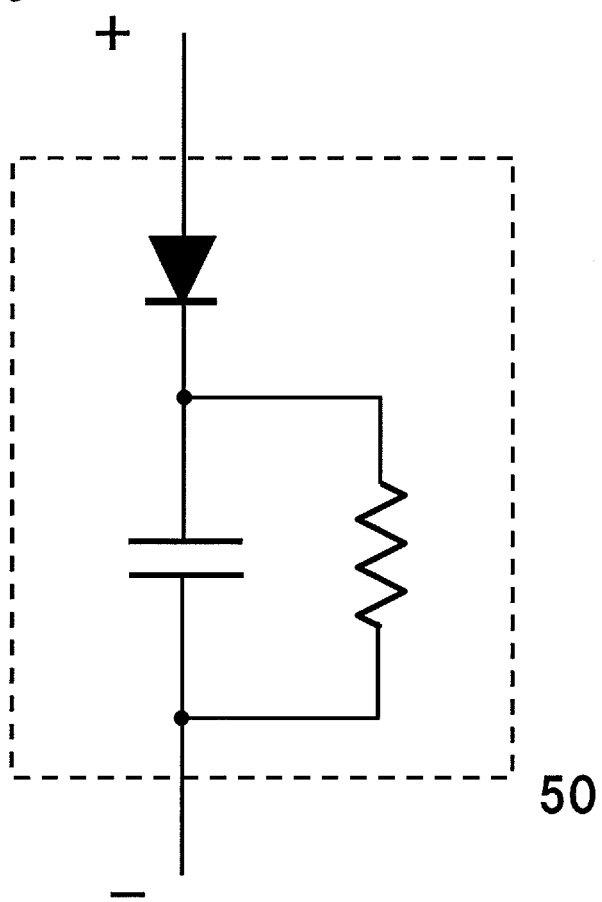
FIG. 16 Illustrates a configuration for the clamp snubber circuit.

Optionally, a clamp snubber circuit 50 may be inserted between the converter section 601 and the switching section 602 as shown in FIG. 15 in order to reduce unwanted oscillation during switching. FIG. 16 illustrates a specific exemplary configuration for the clamp snubber circuit 50, which includes a diode that is connected so that its forward direction is a direction from a positive voltage toward a negative voltage and a capacitor and a resistor that are connected in series to the diode and in parallel with each other. By adopting this configuration, oscillation to be caused by a significant change in voltage during switching can be reduced and the loss involved with switching can be cut down.

Embodiment 3

Hereinafter, an AC converter according to a third embodiment will be described. The AC converter of this embodiment has a switching control section that has a different configuration, and operates differently, from the counterparts of the first and second embodiments described above. But other than that, the AC converter of this embodiment is the same as the first or second embodiment described above. Thus, the following description of this third embodiment will be focused on those differences from the basic configuration of the second embodiment described above, and their common features will not be described all over again to avoid redundancies.

Figure 17:
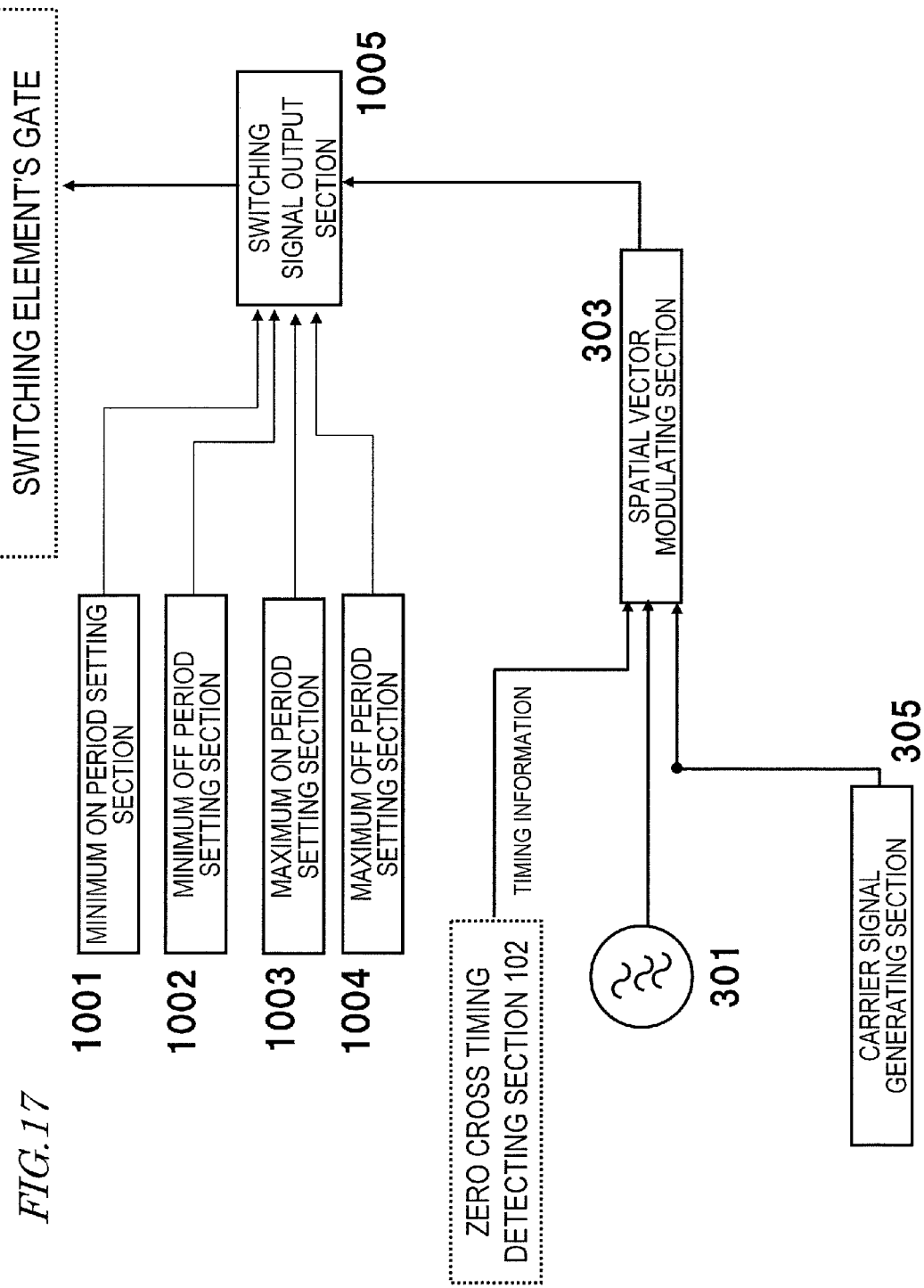
FIG. 17 Illustrates a configuration for a switching control section according to a third embodiment.

FIG. 17 illustrates a general configuration for a switching control section for an AC converter according to this third embodiment. The switching control section of this embodiment further includes a minimum ON period setting section 1001, a minimum OFF period setting section 1002, a maximum ON period setting section 1003, and a maximum OFF period setting section 1004.

The minimum ON period setting section 1001 provides a minimum period of time, for which each switching element can continue to be in ON state, as a piece of switching time information for a switching signal output section 1005. In this case, since each switching element turns ON and OFF at a zero cross point of the input high-frequency AC voltage, that minimum period of time is set to be an integral number of times as long as a half of one period (1/f0) of the input high-frequency AC voltage. That minimum period of time may be either determined in advance or adjusted by the user him- or herself depending on the output status of this AC converter. In the same way, the minimum OFF period setting section 1002 provides a minimum period of time, for which each switching element can continue to be in OFF state, as another piece of switching time information for the switching signal output section 1005. The maximum ON period setting section 1003 provides a maximum period of time, for which each switching element can continue to be in ON state, as still another piece of switching time information for the switching signal output section 1005. And the maximum OFF period setting section 1004 provides a maximum period of time, for which each switching element can continue to be in OFF state, as yet another piece of switching time information for the switching signal output section 1005.

Based on the minimum and maximum ON/OFF periods that have been set as described above for the respective switching elements and the outputs of the space vector modulating section 303, the switching signal output section 1005 outputs a control signal to the respective switching elements to turn them ON and OFF selectively.

Figure 18:
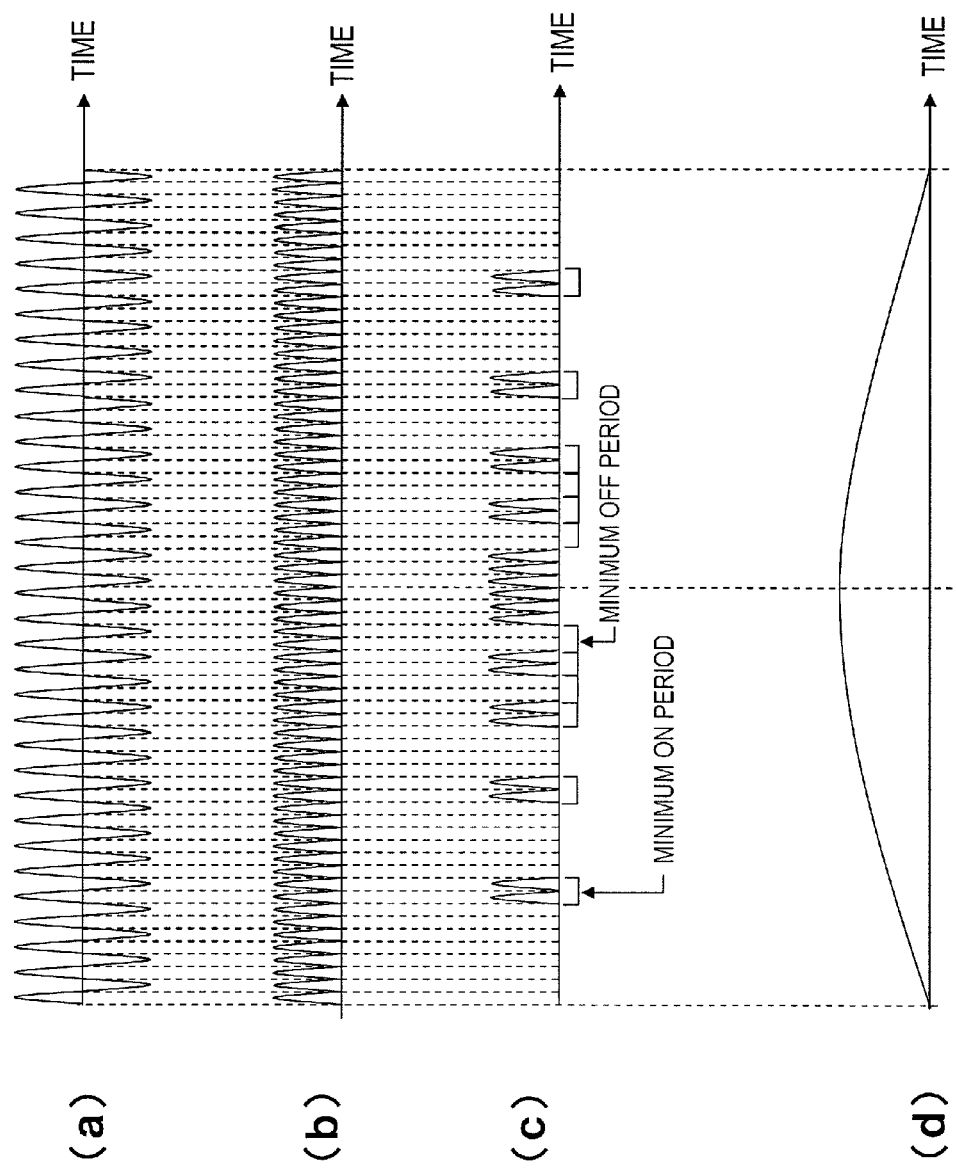
FIG. 18 Illustrates the waveforms of respective voltages according to the third embodiment, wherein (a) illustrates the waveform of an input AC voltage, (b) illustrates the output waveform of a converter section, (c) illustrates the output waveform of a switching section, and (d) illustrates the output waveforms of filters.

FIG. 18 shows the relation between respective waveforms if the frequency of the input high-frequency AC voltage applied to the converter section 601 is indicated by f0 (Hz), the frequency of the output low-frequency AC voltage is indicated by fout (Hz), and the minimum ON period and the minimum OFF period are both supposed to be 1/f0 seconds (which corresponds to one period of the input high-frequency AC voltage). Portions (a) through (d) of FIG. 18 show the input high-frequency AC voltage (with a frequency f0), the output of the converter section 601 (rectified waveform with a pulse width T=1/(2f0)), the output of the switching section 602 and the output waveform of the filter 104 associated with one phase (with a frequency fout), respectively. In this example, f0=33×fout is supposed to be satisfied. As shown in portion (c) of FIG. 18, by setting the minimum ON period and the minimum OFF period, the ON and OFF states are controlled by using one period of the input high-frequency AC voltage (i.e., two half-wave periods of the output of the converter section 601) as a minimum time unit. That is to say, the switching signal output section 1005 does not totally follow the output pulses of the space vector modulating section 303. But once a switching element has been turned ON or OFF, the switching signal output section 1005 maintains that turned-ON or turn-OFF state for a predetermined minimum period of time. Nevertheless, the switching signal output section 1005 controls the respective switching elements so that the final output becomes as close to the sinusoidal wave, which represents a variation in the density of the output pulse of the space vector modulating section 303, as possible. By performing such a control, the number of times of switching required can be reduced compared to a situation where switching is performed using one half-wave period of the output of the converter section 601 as a minimum time unit. As a result, the power needed for switching drive and power loss involved with switching can be both cut down, and an output low-frequency AC voltage can be obtained efficiently. The minimum ON period and the minimum OFF period are supposed to have the same length in this example but may have mutually different lengths as well.

In this case, the smaller the number of times of switching required, the smaller the power loss. That is why the longer the minimum ON period and the minimum OFF period, the more significantly the loss can be cut down. However, if the minimum ON period and the minimum OFF period are extended, then the effects produced would eventually be as if the number of quantization of the PDM modulation performed by the space vector modulating section 303 decreased. That is to say, the degree of smoothness of the variation in the density of the output half-wave of the switching section 602 would decrease, thus possibly causing a distortion in the waveform of the final output low-frequency AC voltage.

Thus, according to this embodiment, to avoid causing such a distortion in the waveform of the final output low-frequency AC voltage, the maximum ON period and the maximum OFF period are further set so that the ON and OFF states can continue for at most only a preset period of time. By adopting such a configuration, the loss involved with switching can be cut down without causing such a waveform distortion in the final output low-frequency AC voltage. In this embodiment, the minimum ON period setting section 1001, the minimum OFF period setting section 1002, the maximum ON period setting section 1003 and the maximum OFF period setting section 1004 are all provided. However, not everything but only some of them may be provided as well.

Figure 19:
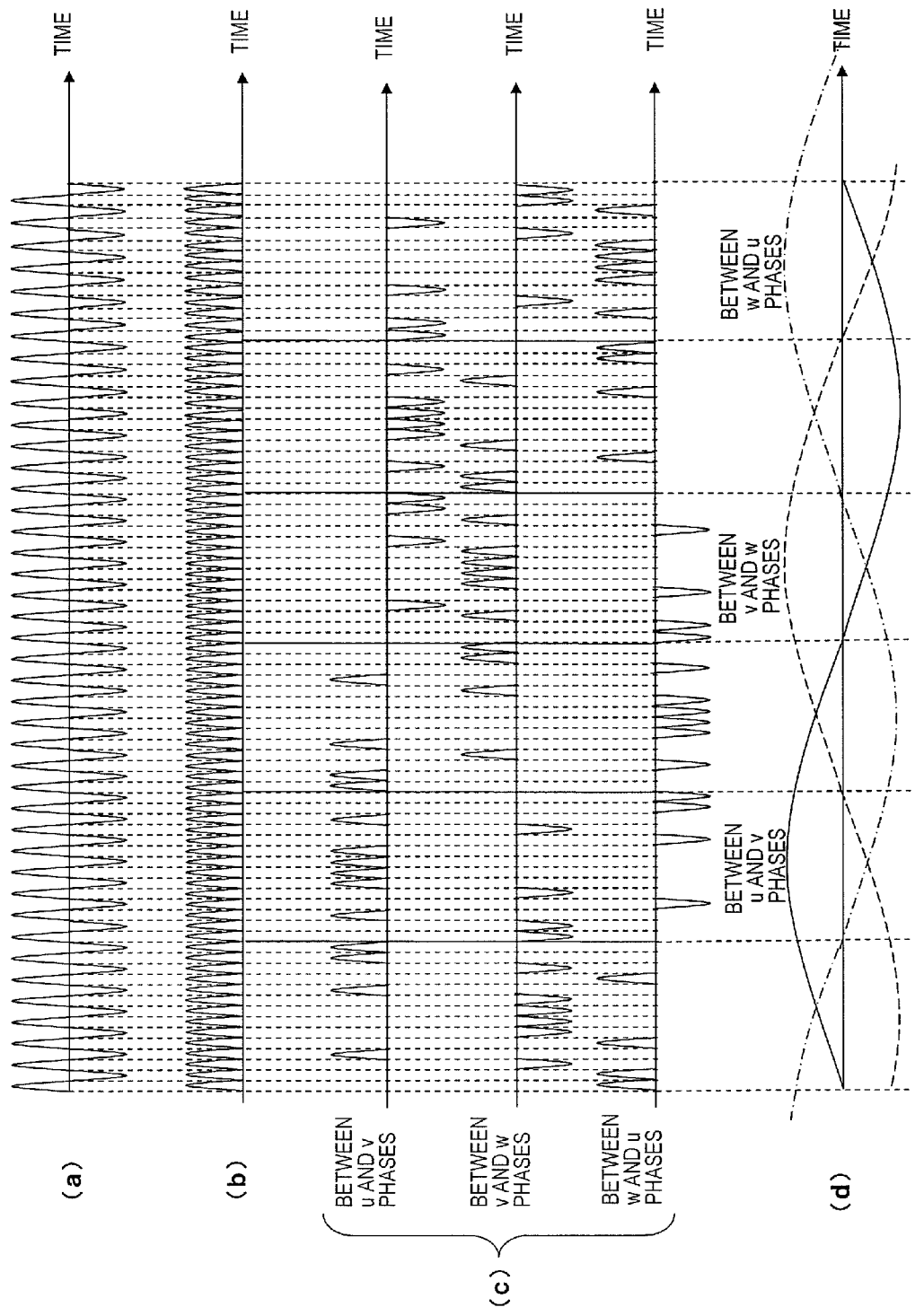
FIG. 19 Illustrates the input and output waveforms in an embodiment in which power is always output to only one phase, wherein (a) illustrates the waveform of an input AC voltage, (b) illustrates the output waveform of a converter section, (c) illustrates the output waveform of a switching section, and (d) illustrates the output waveforms of filters of respective phases.

In the embodiments described above, a control operation may be performed so that a half-period portion of the input high-frequency AC voltage is always output to only one phase at any point in time. FIG. 19 shows the waveform of the input high-frequency AC voltage (with a frequency f0), the output waveform of the converter section 601 (rectified waveform with a pulse which T=1/(2f0)), the output waveform of the switching section 602 to respective phases, and the output waveform of a filter 104 associated with respective phases in a situation where such a control operation has been performed. As shown in FIG. 19, a half-period portion of the input high-frequency AC voltage is always output to only one phase at any point in time. Also, the control operation is performed so that the number of half-wave portions output per period of the input AC voltage becomes the same for any of the uv, vw and wu phases.

Generally speaking, the higher the frequency of an input high-frequency AC voltage, the more easily the voltage will be affected by an impedance variation on a transmission line. For that reason, if an output impedance varies with time in response to an input from a high-frequency AC power supply that has been designed based on a predetermined output impedance, then such a variation will cause a decrease in efficiency. Thus, if the control is performed so that power is always output to only one phase at any point in time, the load on the output end never varies with time. As a result, the output impedance on the transmission line can be kept constant and the power can be converted with a decrease in efficiency minimized.

In the embodiments described above, respective components of the AC converter are illustrated as individual functional blocks. However, the operation of this AC converter may also be performed by making a processor execute a program defining the processing of those functional blocks. Such a program may be stored on a storage medium such as a CD-ROM, a DVD-ROM, or a flash memory or may be downloaded over telecommunications line such as the Internet or an intra net.

INDUSTRIAL APPLICABILITY

According to the technique of the present disclosure, a decrease in conversion efficiency which is often seen when an AC power with a relatively high frequency is converted into an AC power with a relatively low arbitrary frequency can be minimized. Consequently, the power conversion efficiency can be increased when power is returned from a wireless power transmission system back to a utility grid or when a three-phase motor is controlled directly.

REFERENCE SIGNS LIST 10 switching section
30 switching control section
40 converter section
50 clamp snubber circuit
101 switching section
102 zero cross timing detecting section
103 switching control section
104 low-pass filter section (filter)
301 reference sinusoidal wave generating section
302 positive/negative determining section
303 space vector modulating section
304 switching signal output section
3030-1 switching vector determining section
3030-2 switching state determining section
3031 coordinate transformation section
3032 vector sector selecting section
3033 vector duty calculating section
3034 carrier-duty comparing section
3035 switching timing determining section
305 carrier signal generating section
601 converter section
602 switching section
603 switching control section
701 switching signal output section
1001 minimum ON period setting section
1002 minimum OFF period setting section
1003 maximum ON period setting section
1004 maximum OFF period setting section
1403 switching control section
1501 reference sinusoidal wave
1502 triangular wave

The invention claimed is:

1. An AC converter that converts a single-phase input AC voltage with a frequency (f0) into a three-phase output AC voltage with a frequency (f1) that is lower than (f0), the converter comprising:
   a switching section that converts the single-phase input AC voltage in response to a control signal and that outputs a converted voltage to a phase that has been selected in accordance with the control signal;
   a filter section that filters out high frequency components from the converted voltage, thereby converting the converted voltage into the three-phase output AC voltage; and
   a switching control section that performs a pulse density modulation on a phase-by-phase basis and based on a reference signal with the frequency (f1) which is associated with an output AC voltage of each phase of said three-phase output AC voltage, synchronously with a zero cross of the single-phase input AC voltage, thereby generating the control signal according to a pulse generation status by the pulse density modulation and polarity of the single-phase input AC voltage and sending out the control signal to the switching section, and
   wherein the switching section includes a first type of switching element that applies a first positive voltage to a phase that is associated with the first type of switching element if the polarity of the single-phase input AC voltage is positive and a second type of switching element that applies a second positive voltage to a phase that is associated with the second type of switching element if the polarity of the single-phase input AC voltage is negative, and wherein if the polarities of the single-phase input AC voltage and the reference signal for use in the pulse density modulation are both positive, the switching control section outputs the control signal to control the switching section to turn the first type of switching element ON, and if the polarities of the single-phase input AC voltage and the reference signal for use in the pulse density modulation are negative and positive, respectively, the switching control section outputs the control signal to control the switching section to turn the second type of switching element ON, and if the polarities of the single-phase input AC voltage and the reference signal for use in the pulse density modulation are positive and negative, respectively, the switching control section outputs the control signal to control the switching section to turn the second type of switching element ON, and if the polarities of the single-phase input AC voltage and the reference signal for use in the pulse density modulation are both negative, the switching control section outputs the control signal to control the switching section to turn the first type of switching element ON, and wherein the switching control section outputs the control signal to control the switching section so as to avoid turning ON both of the first and second types of switching elements that are associated with the same phase at the same time, and wherein the switching control section performs the pulse density modulation based on a space vector modulation.

2. The AC converter of claim 1, wherein the switching control section includes:

a reference signal generating section that generates three different reference signals with the frequency (f1) which are associated with output AC voltages of respective phases synchronously with the zero cross of the single-phase input AC voltage;

a carrier signal generating section that generates a carrier signal having a higher frequency than the frequency of the three different reference signals; and a space vector modulating section that performs a space vector modulation based on the three different reference signals that have been generated by the reference signal generating section and the carrier signal that has been generated by the carrier signal generating section, and wherein the space vector modulating section determines conduction states of respective switching elements in the switching section by reference to the three different reference signals and determines duration of a conduction state of each said switching element by reference to the carrier signal.

3. The AC converter of claim 2, wherein the space vector modulating section transforms the three different reference signals into pulses by space vector modulation and outputs the pulses to the switching elements associated with the respective phases synchronously with the zero cross of the single-phase input AC voltage.

4. The AC converter of claim 3, wherein the switching control section includes:

a positive/negative determining section that determines polarity of the single-phase input AC voltage; and a switching signal output section that a) generates the control signal based on the pulses supplied from the space vector modulating section and a decision made by the positive/negative determining section and b) sends out the control signal to the switching section.

5. The AC converter of claim 1, wherein the switching control section changes ON and OFF states of respective first type and second type switching elements at a time interval that is equal to or longer than a minimum ON period and a minimum OFF period that have been set in advance, and wherein the minimum ON period and the minimum OFF period are set to be n1/2f0 (where n1 is an integer that is equal to or greater than two).

6. The AC converter of claim 1, wherein the switching control section changes ON and OFF states of respective first type and second type switching elements at a time interval that is equal to or shorter than a maximum ON period and a maximum OFF period that have been set in advance, and wherein the maximum ON period and the maximum OFF period are set to be n2/2f0 (where n2 is an integer that is equal to or greater than two).

7. The AC converter of claim 1, wherein the switching control section controls the switching section so that a portion of the single-phase input AC voltage that covers a half period is always output only to one particular phase.

8. The AC converter of claim 1, further comprising a zero cross timing detecting section that detects a timing when the single-phase input AC voltage goes to zero and notifies the switching control section of said timing.

9. An AC converter that converts a single-phase input AC voltage with a frequency (f0) into a three-phase output AC voltage with a frequency (f1) that is lower than (f0), the converter comprising:

a converter section that converts the single-phase input AC voltage into a DC voltage;

a switching section that converts the DC voltage in response to a control signal and that outputs a converted voltage to a phase that has been selected in accordance with the control signal;

a filter section that filters out high frequency components from the converted voltage, thereby converting the converted voltage into the three-phase output AC voltage; and a switching control section that performs a pulse density modulation on a phase-by-phase basis and based on a reference signal with the frequency (f1), which is associated with an output AC voltage of each phase of said three-phase output AC voltage, synchronously with a zero cross of the single-phase input AC voltage, thereby generating the control signal according to a pulse generation status by the pulse density modulation and sending out the control signal to the switching section, wherein the switching section includes a first type of switching element that applies a first positive voltage to a phase that is associated with the first type of switching element if the polarity of the single-phase input AC voltage is positive and a second type of switching element that applies a second positive voltage to a phase that is associated with the second type of switching element if the polarity of the single-phase input AC voltage is negative, and wherein if the polarity of the reference signal for use in the pulse density modulation is positive, the switching control section outputs the control signal to control the switching section to turn the first type of switching element ON, and wherein if the polarity of the reference signal for use in the pulse density modulation is negative, the switching control section outputs the control signal to control the switching section to turn the second type of switching element ON, and wherein the switching control section outputs the control signal to control the switching section so as to avoid turning ON both of the first and second types of switching elements that are associated with the same phase at the same time, and wherein the switching control section performs the pulse density modulation based on a space vector modulation.

10. The AC converter of claim 9, comprising a snubber circuit that is provided between the converter section and the switching section to reduce unwanted oscillation at the time of switching.

11. The AC converter of claim 10, wherein the snubber circuit includes a diode, a capacitor and a resistor.

* * * * *